March 11, 1930.  F. M. CARROLL  1,750,459
INDIVIDUALLY RESETTABLE ACCUMULATOR UNIT TABULATOR
Filed Nov. 12, 1926   12 Sheets-Sheet 1
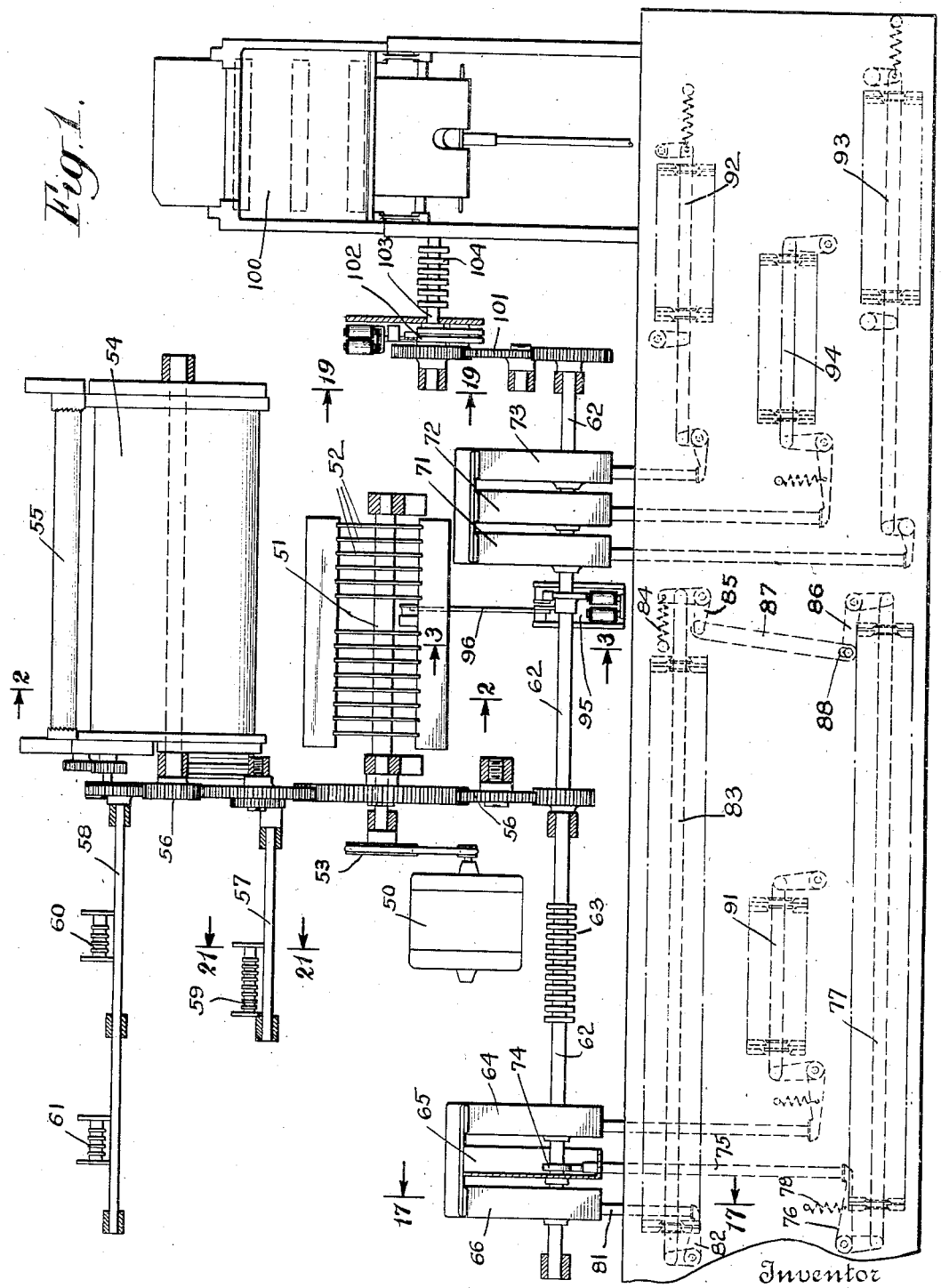
Inventor
FRED M. CARROLL
By his Attorney
W. W. Wilson March 11, 1930.  F. M. CARROLL  1,750,459
INDIVIDUALLY RESETTABLE ACCUMULATOR UNIT TABULATOR
Filed Nov. 12, 1926  12 Sheets-Sheet 2
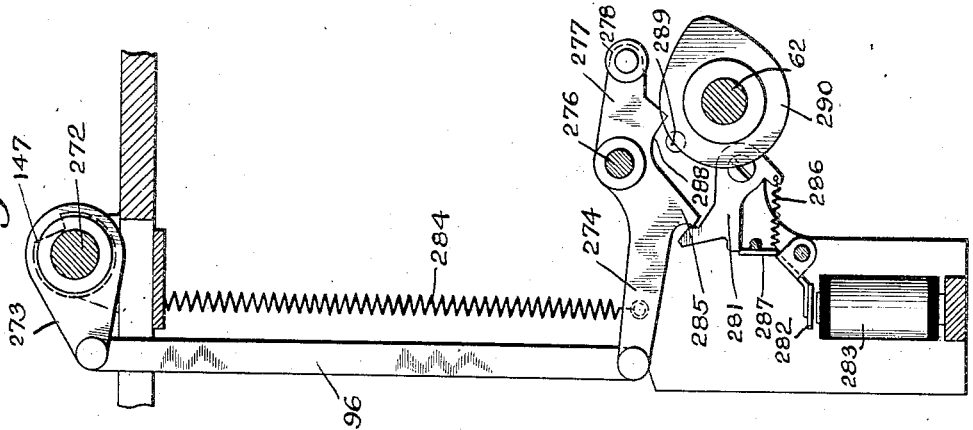
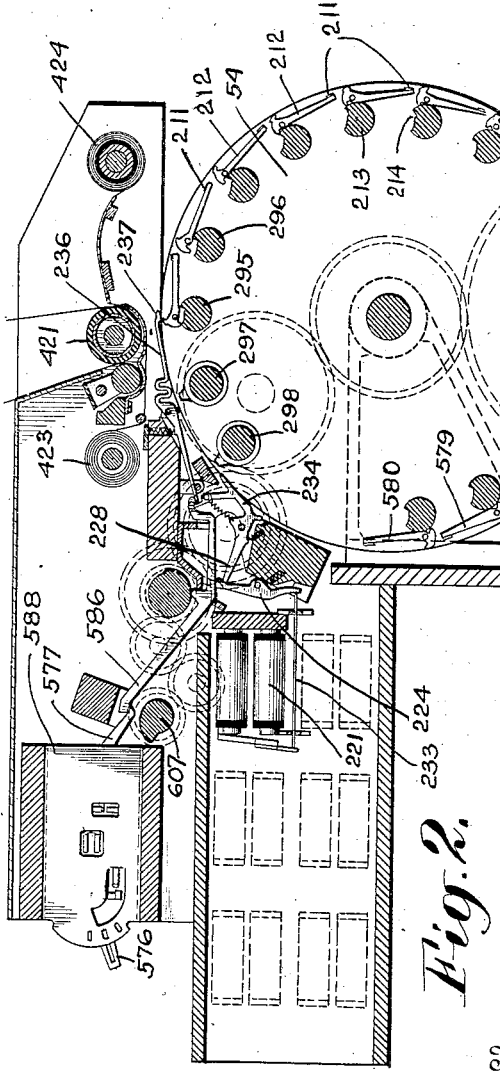
Inventor
FRED M. CARROLL
By his Attorney

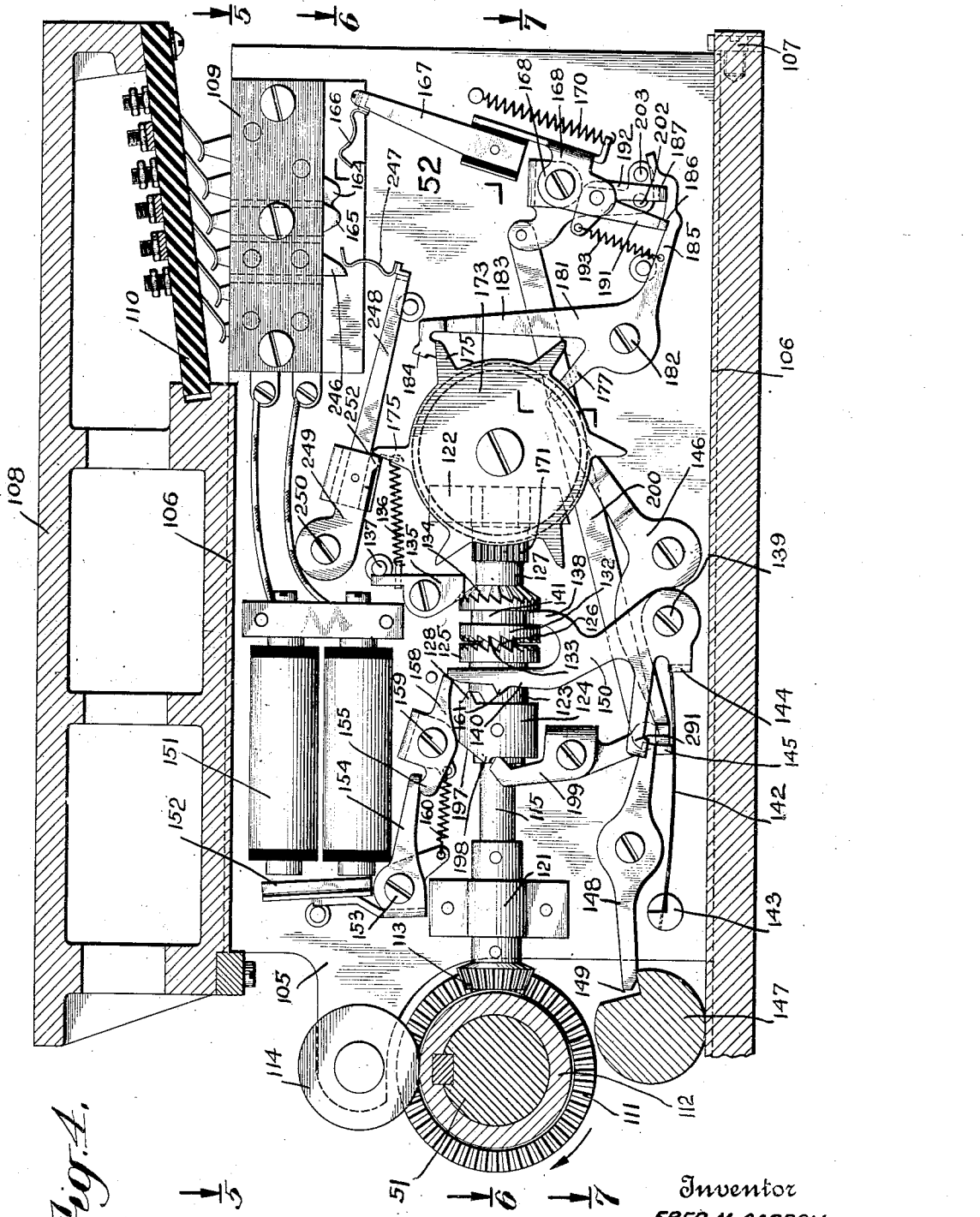

March 11, 1930.  F. M. CARROLL  1,750,459
INDIVIDUALLY RESETTABLE ACCUMULATOR UNIT TABULATOR
Filed Nov. 12, 1926  12 Sheets-Sheet 4
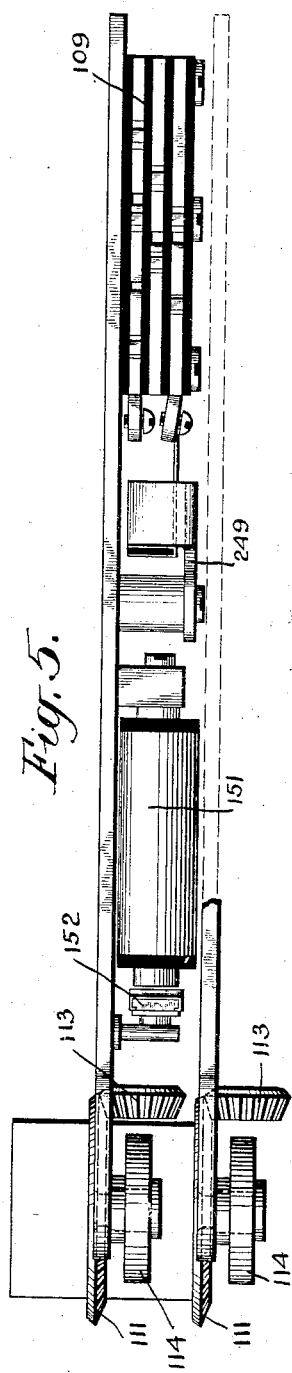
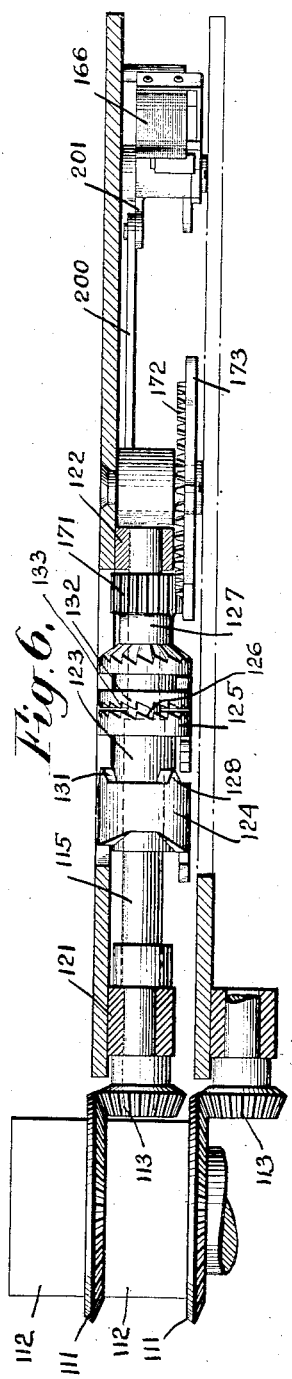
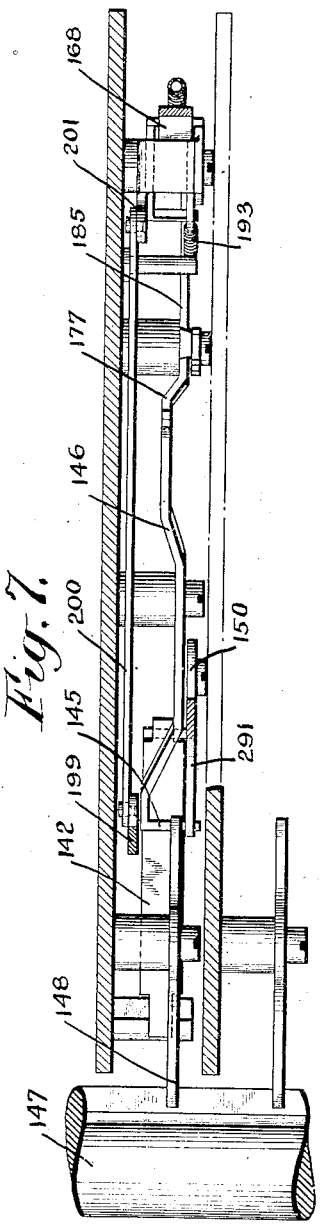
Inventor
FRED M. CARROLL
By his Attorney March 11, 1930.  F. M. CARROLL  1,750,459
INDIVIDUALLY RESETTABLE ACCUMULATOR UNIT TABULATOR
Filed Nov. 12, 1926  12 Sheets-Sheet 5
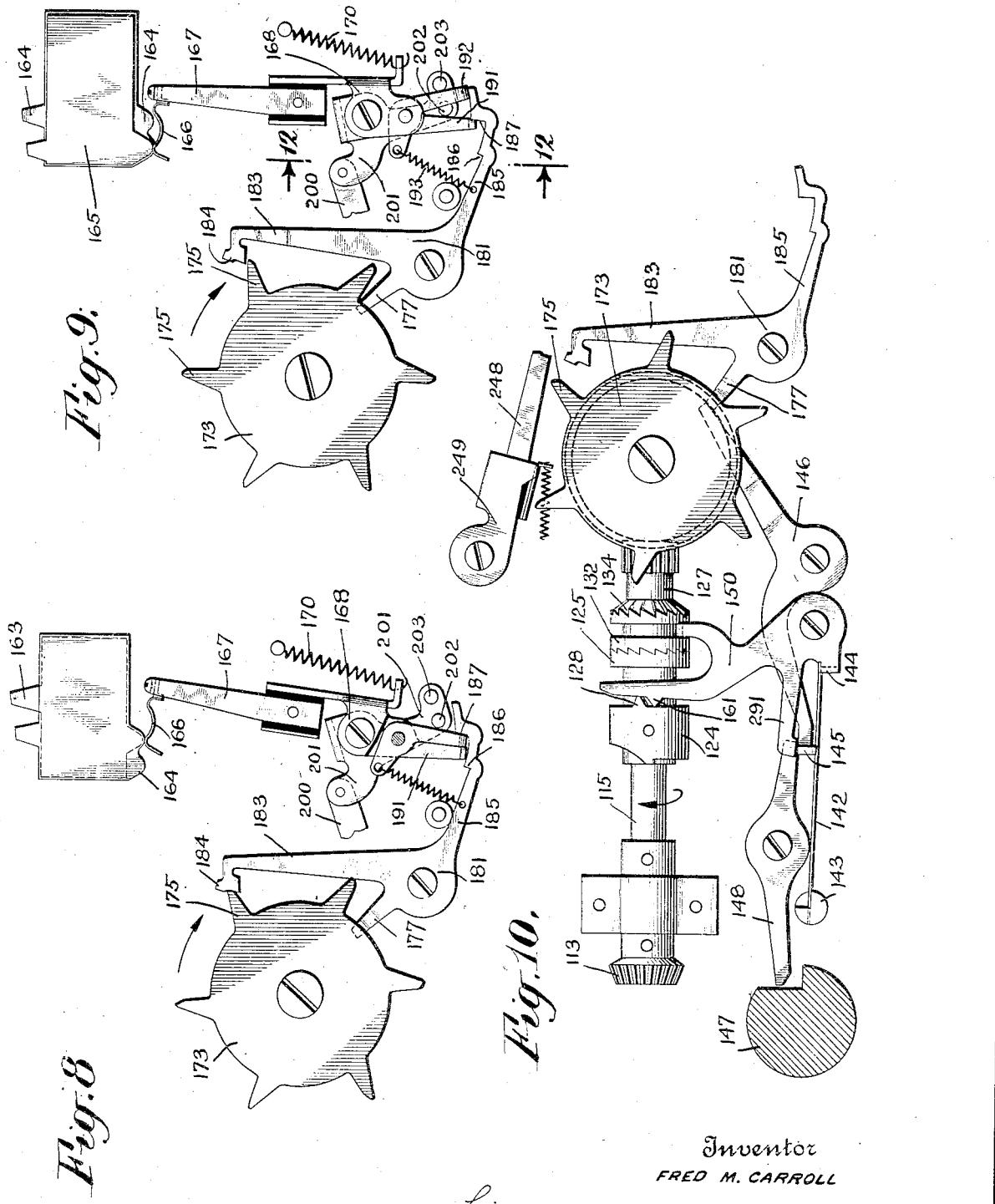
Inventor
FRED M. CARROLL
By his Attorney
W. M. Wilson March 11, 1930. F. M. CARROLL 1,750,459
INDIVIDUALLY RESETTABLE ACCUMULATOR UNIT TABULATOR
Filed Nov. 12, 1926 12 Sheets-Sheet 6
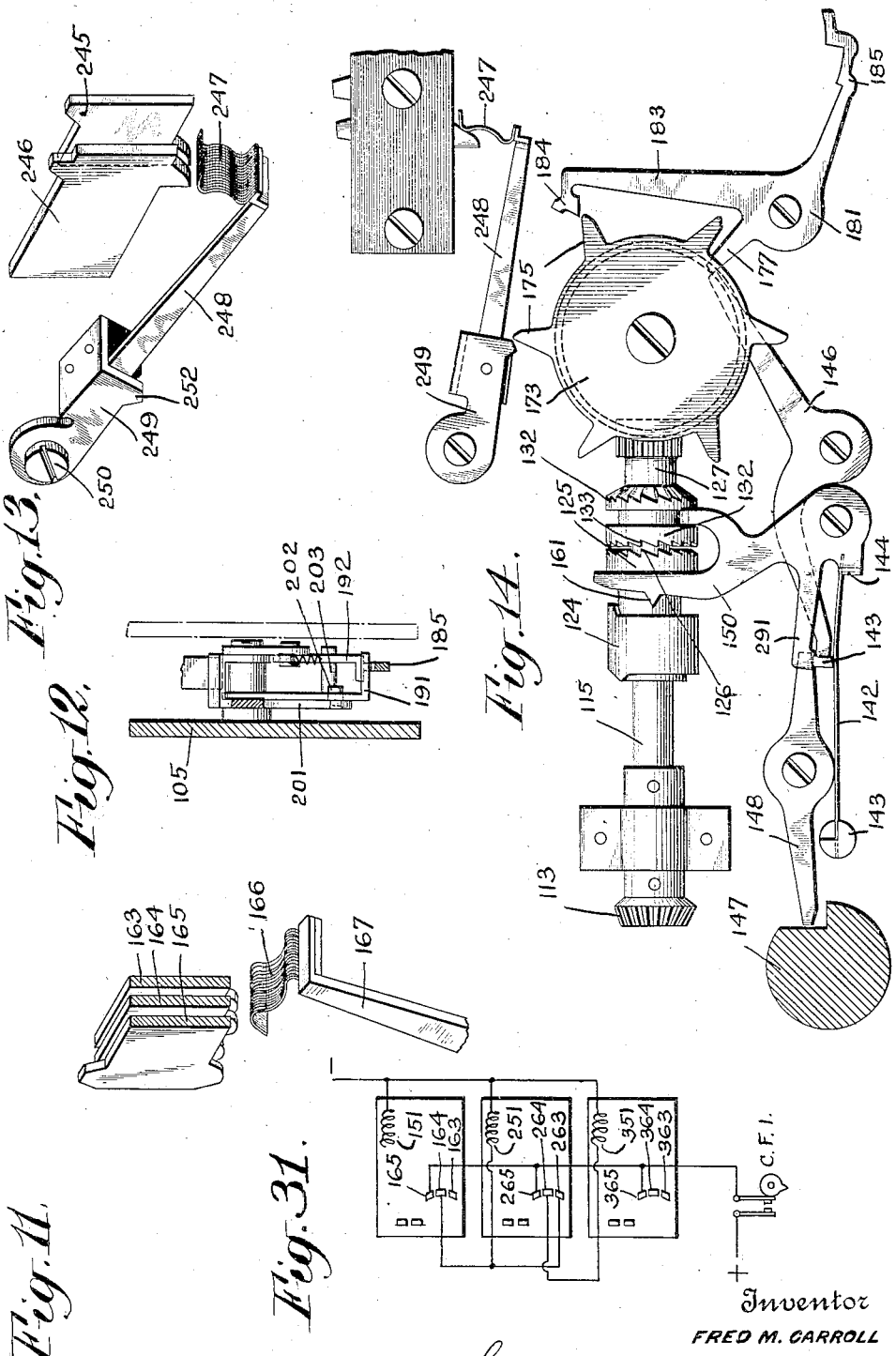
Inventor
FRED M. CARROLL
By his Attorney
W. W. Wilson March 11, 1930.   F. M. CARROLL   1,750,459
INDIVIDUALLY RESETTABLE ACCUMULATOR UNIT TABULATOR
Filed Nov. 12, 1926   12 Sheets-Sheet 7
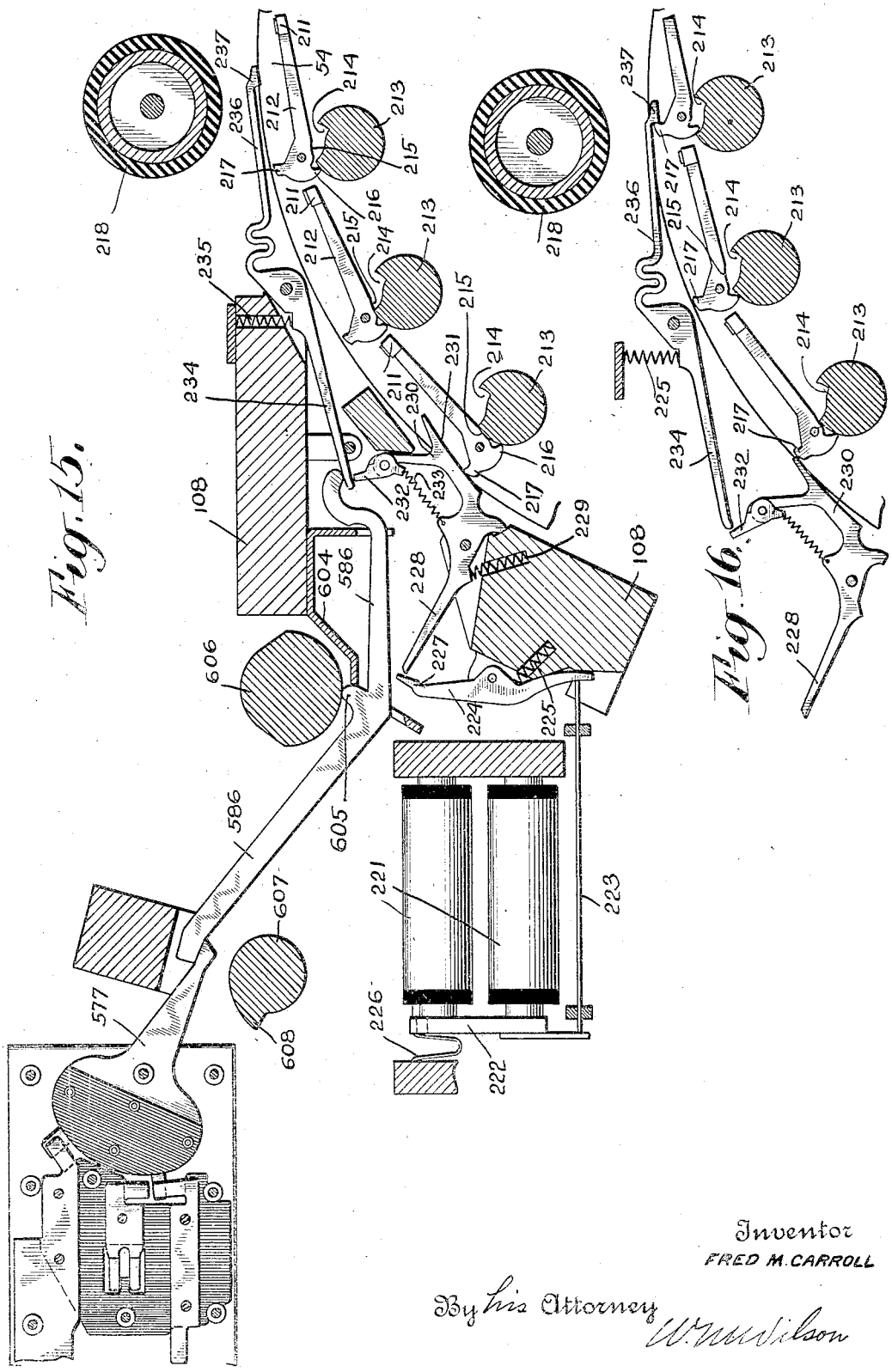
Inventor
FRED M. CARROLL
By his Attorney
W. M. Wilson March 11, 1930. F. M. CARROLL 1,750,459
INDIVIDUALLY RESETTABLE ACCUMULATOR UNIT TABULATOR
Filed Nov. 12, 1926 12 Sheets-Sheet 8
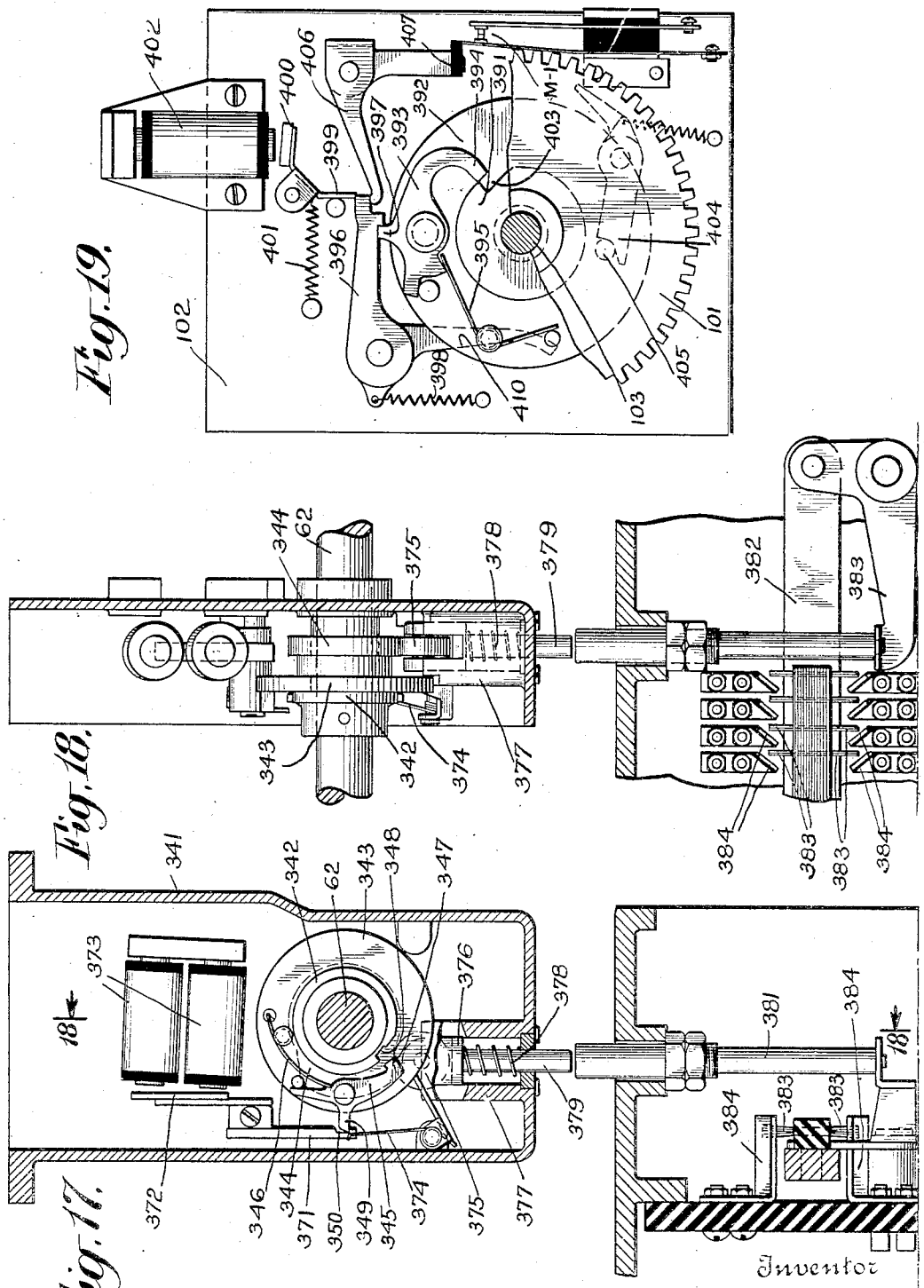
Inventor
FRED M. CARROLL
By his Attorney

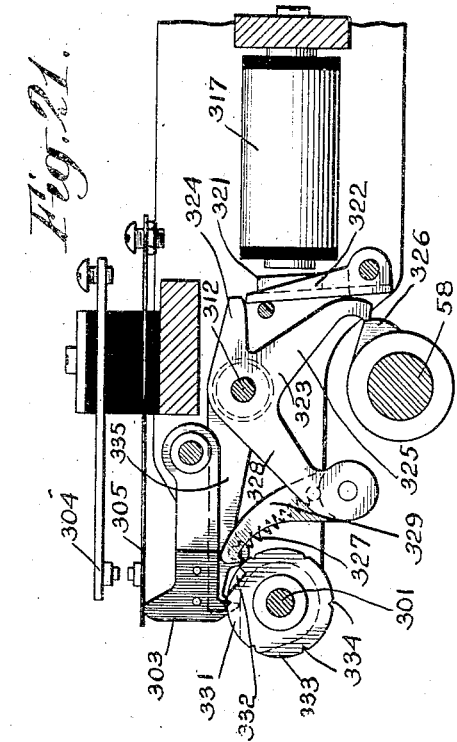
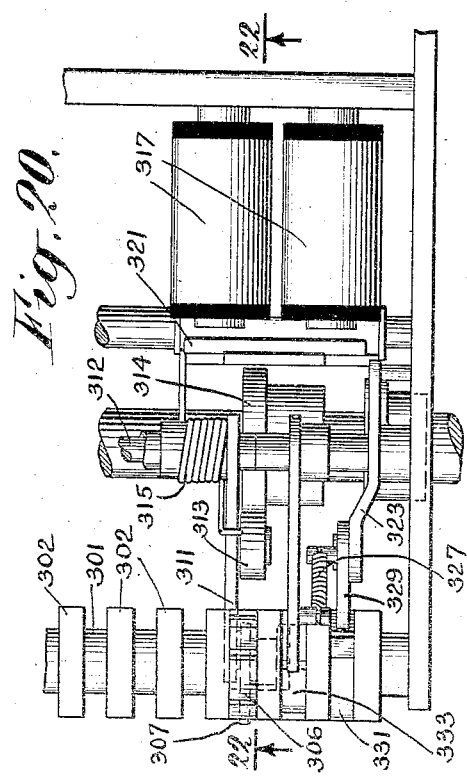
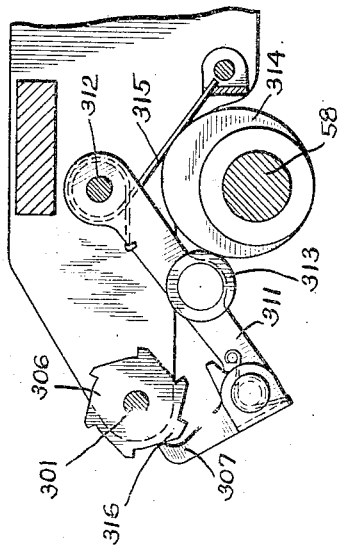
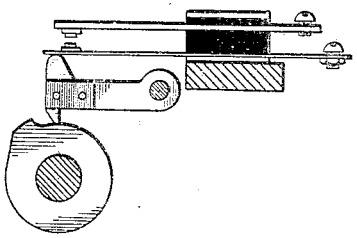

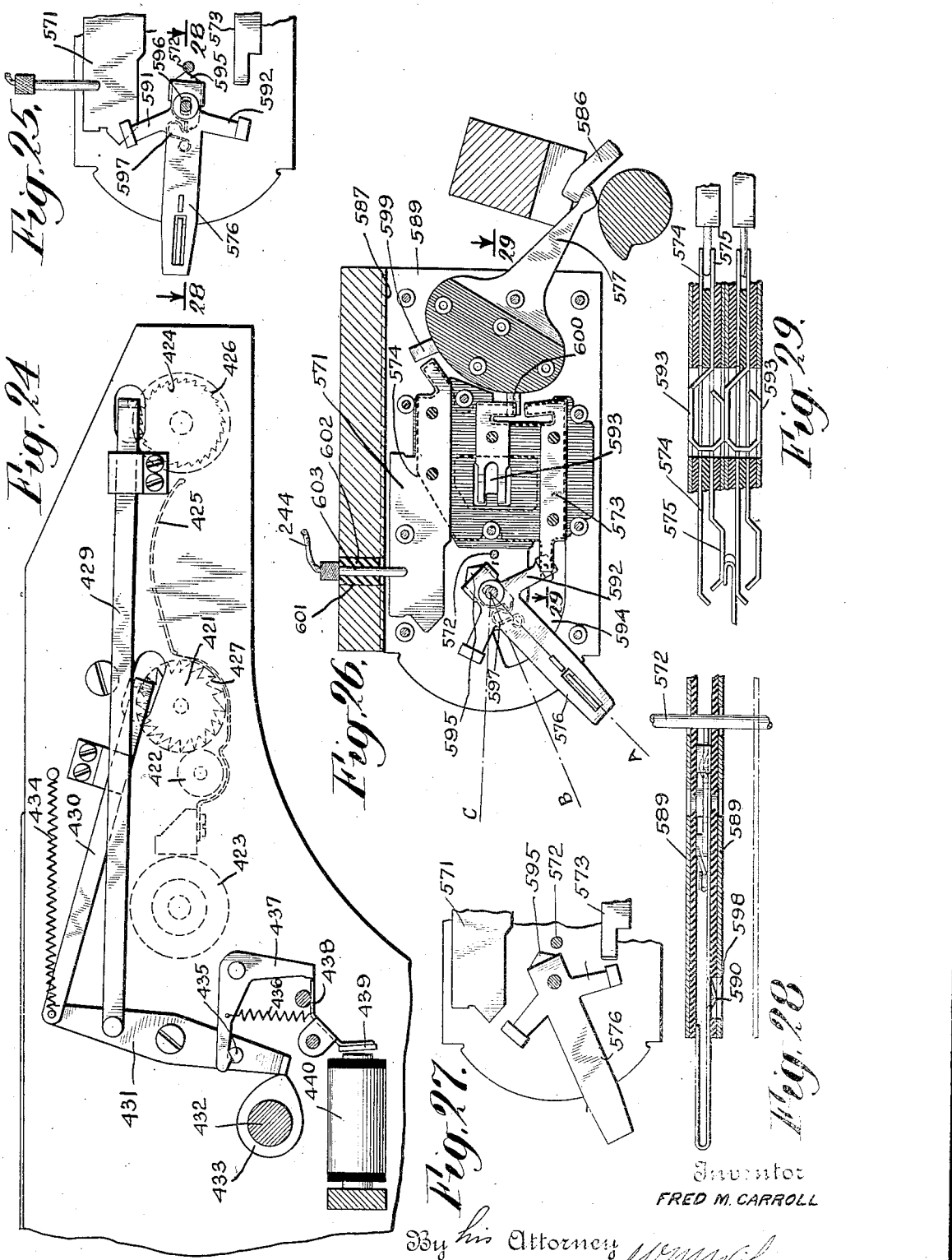

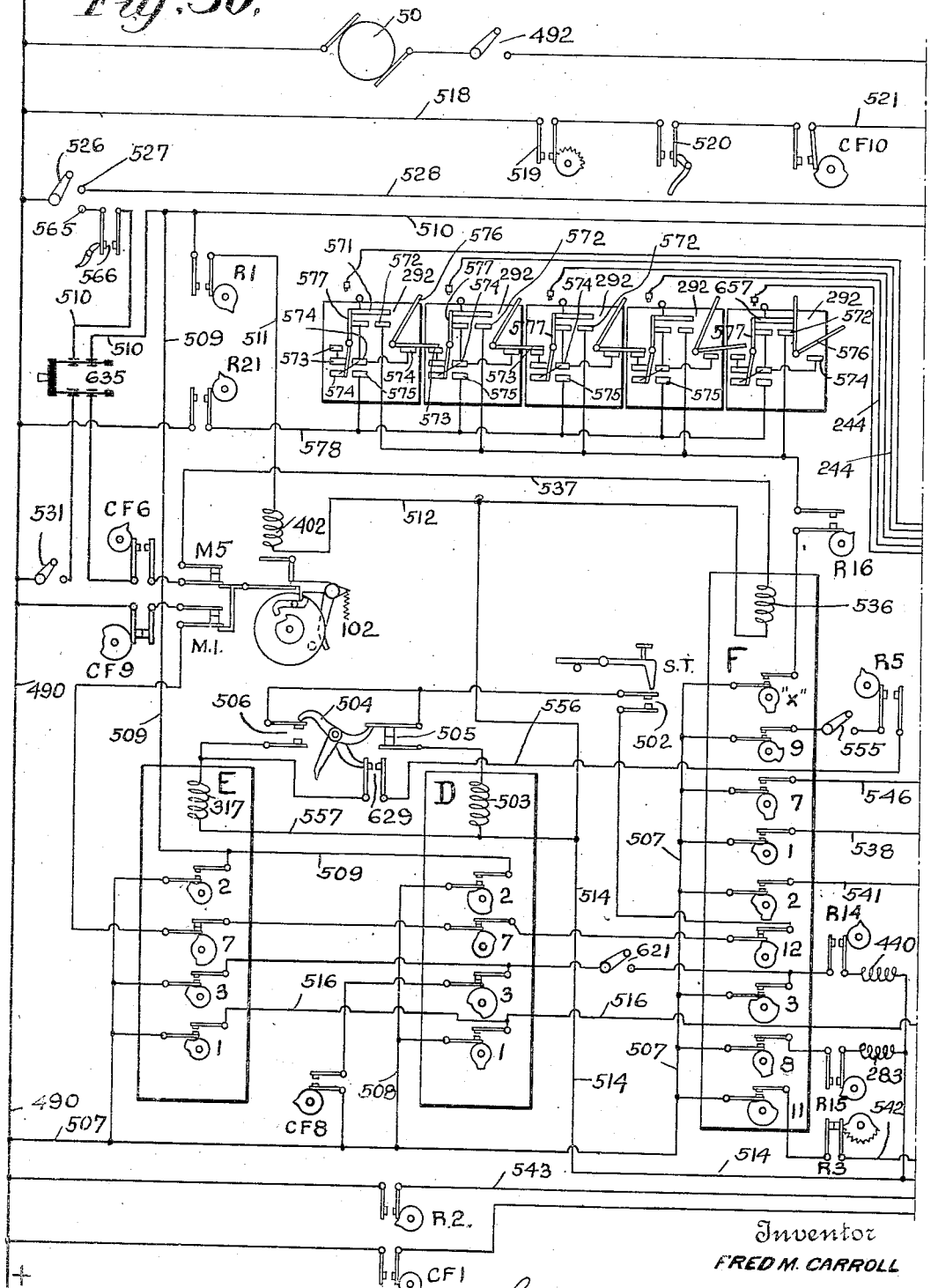

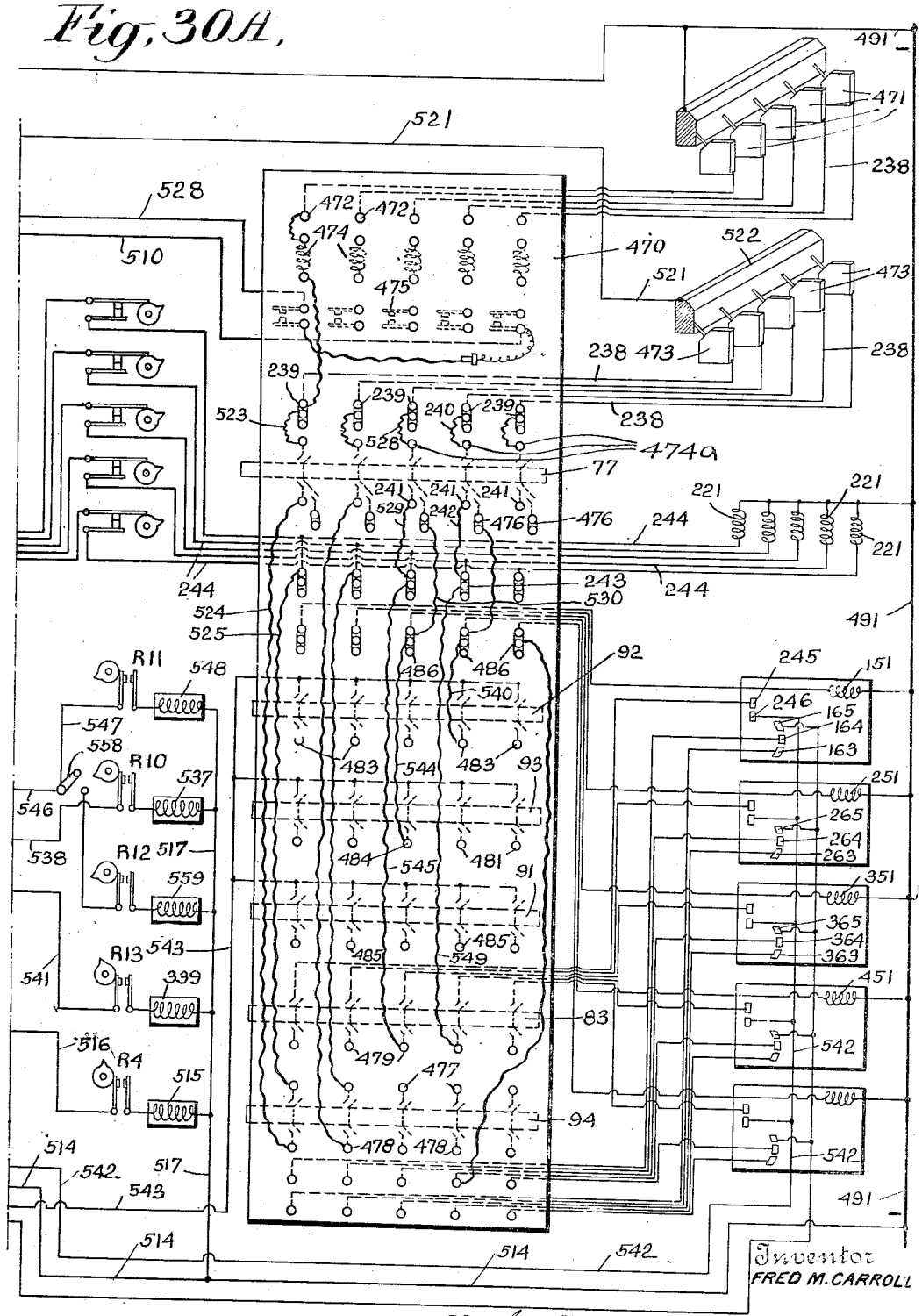

Patented Mar. 11, 1930

1,750,459

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

INDIVIDUALLY-RESETTABLE ACCUMULATOR-UNIT TABULATOR

Application filed November 12, 1926. Serial No. 147,960.

This invention is directed to improvements in accounting machines and while the improvements, in whole or in part are adapted to machines of this general class of widely different characteristics, they have been found to be particularly useful in connection with the machines disclosed in my previous applications, Serial No. 36,594, filed June 12, 1925 and Serial No. 63,826, filed October 21, 1925. These prior applications concern printing tabulating machines and provide for listing and printing totals at tabulating speed, owing to the use of a rotary drum printer disclosed in my Patent No. 1,516,079. These machines also provide for universally sub-dividing an accumulator bank and for using any accumulating units, regardless of their position to constitute a desired bank. These features are all common to the present invention which is an improvement over the prior forms in that the printing control mechanism is simplified and rendered more flexible in operation and the operation of the tabulator mechanism both for tabulating proper and controlling total printing, is considerably simplified. The present invention, furthermore, provides for selectively printing totals standing on the accumulator banks with or without clearing the banks from which such totals are taken and for automatically controlling successive cycles of machine operation to the end that manual operations necessary to cause the machine to perform its functions may be reduced to a minimum.

The principal object of the invention is to provide for improved and more flexible operation of machines of the class described owing to the provision of novel construction and arrangement of the machine parts.

A more specific object of the invention is to provide for more flexible operation of machines of this class by operatively connecting the printing devices to the accumulating devices by means of selective connections to permit any desired printing device to be controlled by any accumulating device.

Another object of the invention is to provide printing control magnets structurally distinct from the accumulating devices whereby the magnets may be located in any convenient location with respect to their associated printing devices to permit a simplified printing transmission system.

Another object of the invention is to provide a machine of this class which may be set into automatic operation by a single manual operation, such as pressing a button, regardless of the position of the controlling records with respect to the analyzing devices.

Another object of the invention is to provide a machine of this class which may be started after an emergency stopping operation without initiating undesirable restoring or printing operations and to provide a novel arrangement of elements for performing this function.

Another object of the invention is to provide for automatically controlling the machine operation through a plurality of successive cycles of operation to improve and supply additional features to the starting and printing functions of the machine.

Another object of the invention is to provide automatic timers for controlling the initial operating cycles of the machine and to control several successive cycles on a change in the mode of operation of the machine.

Another object of the invention is to provide for controlling total printing by the accumulating devices so that the devices may be selectively cleared or not cleared on taking the total.

Another object of the invention is to provide for controlling total printing by the accumulating units so that a total may be printed at the time the accumulating element reaches home position and to further provide for selectively arresting the accumulating element in home position or causing it to regain its initial position to hold the total on the accumulating bank.

Another object of the invention is to provide for controlling total printing by the accumulating devices so that a total may be printed while the accumulating element is in motion and passing through home position and to provide for subsequently reentering the printed total in the accumulating device.

Another object of the invention is to provide for independently controlling the operation of the printing devices and accumulating devices during listing operations and for selectively controlling the operation of the printing devices by the accumulating devices during total printing operations.

Another object of the invention is to provide a single call mechanism for each printing device and to provide for selectively connecting any call mechanism directly to any analyzing device for listing and for selectively connecting any call mechanism to any accumulating device for total printing.

Another object of the invention is to provide an improved paper feed for machines of this class.

Another object of the invention is to provide for electrical control of the machine elements in any of the above mentioned operations.

Other and further objects of the invention will be in part pointed out and in part obvious as the description proceeds.

While as above mentioned, the invention is adapted to many forms of accounting machines it has been found to be particularly useful in machines of the printing tabulator type as disclosed in my above mentioned co-pending applications and will be described as applied to machines of the type therein disclosed. These tabulators are designed to analyze records and perform accounting and printing operations with the items recorded thereon. The most common form of records consists of cards divided into columns which in turn are divided into index points. Items may be recorded by perforating the cards in different index point positions of the several columns. The simplest make up of the cards provided for ten active index point positions representing the nine significant digits and zero and these numerals may designate data of any desired character. In addition to the active index point positions there are several inactive ones in which the machine selects no data from the cards but performs other functions necessary to its complete operation as an accumulator and printer. It is quite possible, of course, to use some of these extra positions for recording additional data to be analyzed and obviously the controlling records may make use of one of the more complicated combinational hole systems, but to simplify the explanation it will be assumed that the present machine is concerned with cards having only ten active index points, representing the nine digits and zero, and that the cards are provided with sufficient extra positions to permit the machine to perform its necessary functions not directly concerned with analyzing the record cards.

The record cards are fed automatically beneath analyzing brushes, of which in the present embodiment, one is provided for each card column. An analyzing brush, on encountering a perforation in the card, closes a control circuit which effects the operation of certain accumulating or printing devices to add or print the particular number represented by the position of the perforation in the card column. All the mechanisms of the machine are synchronized in their movements with the passage of the cards beneath the brushes so that whenever a brush senses a perforation the number represented by the particular index point concerned will be entered into the accumulating devices or printed or both. After one or more items have been entered into the accumulators the total may be printed, the printing devices in this case being placed under control of the accumulators.

The tabulator described in my prior application Serial No. 638,826 has its accumulating mechanism divided into separable replaceable units each representing a different denominational order and each adapted to be independently controlled by the analyzing mechanism of the machine. The units each include a counter element with an individual differential mechanism for operating it and individual counter and total printing control magnets. The printer operating mechanism consists of a mechanical transmission system extending from each unit to a corresponding printing device. The printing for both listing and total printing is effected by mechanical control devices associated with the accumulating elements which operate a printing call wire when the clutch of the counter engages for tabulating in the case of listing and operate the same call wire when the clutch disengages at the end of the resetting and clearing operation in the case of total printing. The function of the total printing control magnet in this construction is merely to disable the listing control device and make the total printing control device effective when it is desired to print a total. According to the present invention the total printing control magnet is dispensed with and all printing is effected by call magnets which are not necessarily incorporated in the accumulating units but may be placed in any convenient location. Preferably they are placed in proximity to their respective printing devices to permit of a simple construction of the transmission system between the call magnets and the printing devices. The control of the call magnets for listing is removed entirely from the accumulator units and the magnets are placed directly under control of the analyzing brushes. In the case of total printing, however, the call magnets are electrically controlled from the accumulating devices. The call magnets are furthermore not permanently connected to any particular brush and accumulating unit but to a multiple plugging system on a panel-board to which the brushes and accumulator controls are also connected. This arrangement permits any printing call magnet to be controlled by any desired analyzing brush for listing and by any desired accumulating unit for total printing. The unit construction of the accumulators is retained to preserve the advantages derived therefrom and the multiple plugging system permits any accumulating units to be interconnected for conjoint operation and any particular unit or units to be controlled by any desired analyzing brush.

The previous machines provide for total printing under the control of the accumulating units when the latter reach home position after a restoring operation, but in order to print totals it is necessary to clear the accumulator banks. According to the present invention totals may be printed either with or without clearing the accumulators. This is preferably accomplished by causing operation of the printing devices through an electrical control system when the accumulating devices reach home position and provision is made for selectively arresting the movement of the accumulating devices in home position or permitting them to move to their initial position for reentering the original items therein.

The general operation of the machine is further improved according to the present invention by an electrical control system in which, when a machine operation is initiated, be it tabulating, listing or totalling, the controlling circuits of the machine are placed under the control of automatic timers which properly govern the operation during a plurality of successive cycles and these timers are automatically selected for operation in accordance with the particular conditions prevailing at the time the operation is initiated. Thus if there are no record cards under the upper and lower brushes the starting operation will automatically select a timer which will control the machine operation for a sufficient number of cycles to permit the cards to feed under the upper and lower brushes, after which the control will be assumed by the usual automatic controlling system of the machine. This makes it possible to always start the machine by simply depressing the starting key thus avoiding a succession of manual conditioning operations which have heretofore been necessary. The beginning of a totalling operation calls another timer into operation which likewise assumes automatic control of the machine for a plurality of cycles, in one of which total printing without reset may be effected from selected accumulator banks and in another of which total printing with resetting of the accumulators may be effected on other banks. The manual operations necessary to control the machine are thus reduced to a minimum.

The invention is illustrated, by way of example in the accompanying drawings, in which the same reference numerals designate the same parts throughout the several views, and in which Fig. 1 is a diagrammatic arrangement of the entire machine assembly, the casing and supporting structures being omitted for the sake of clearness.

Fig. 2 is a sectional view through the accumulating and printing mechanism along line 2—2 of Fig. 1.

Fig. 3 is a view partly in section along line 3—3 of Fig. 1 showing the rocking mechanism for the printing control rock shaft.

Fig. 4 is a view partly in section along line 4—4 of Fig. 1 showing an accumulator unit.

Figs. 5, 6 and 7 are sectional views along lines 5—5, 6—6 and 7—7 respectively of Fig. 4.

Figs. 8 and 9 are detail views showing different positions of the transfer mechanism.

Figs. 10 and 14 are detail views showing different positions of the total printing control mechanism.

Fig. 11 is a detail isometric view of the transfer contacts and wiper.

Fig. 12 is a sectional view along line 12—12 of Fig. 9.

Fig. 13 is a detail isometric view of the total printing control contacts and wiper.

Figs. 15 and 16 are detail views showing the printing mechanism in different positions.

Fig. 17 is a view partly in section along line 17—17 in Fig. 1 showing the interior of one of the controlling jacks.

Fig. 18 is a sectional view along line 18—18 of Fig. 17.

Fig. 19 is an elevational view of the card feed clutch along line 19—19 of Fig. 1.

Figs. 20 and 21 are plan and elevational views respectively of one of the controlling timers, Fig. 21 being along line 21—21 of Fig. 1.

Fig. 22 is a section along line 22—22 of Fig. 20.

Fig. 23 is a detail view illustrating the general form and construction of the regular and card feed cam contacts.

Fig. 24 is an elevation of the paper feed mechanism.

Figs. 25, 26, 27, 28 and 29 are detail views of the zero and special character printing control mechanism, Fig. 28 being along line 28—28 of Fig. 25 and Fig. 29 being along line 29—29 of Fig. 26.

Figs. 30 and 30^A taken together show a complete circuit diagram of the machine, and Fig. 31 is a fragmentary circuit diagram, illustrating this transferring operation.

A general idea of the machine operation may be best obtained from Fig. 1 which, although schematic in form, shows the essential elements for a completely operative machine properly coordinated. The motive power for driving the machine is furnished by an electric motor 50 which drives all the operating shafts through suitable gear trains. The tabulator shaft 51 is operatively connected to the accumulator units 52 and is driven through a gear train and pulley 53 by the motor. The printing drum 54 and platen 55 together with the necessary paper feed mechanism (not shown) are driven through a gear train indicated generally at 56 and an extension of this train operates the shafts 57 and 58 on which are mounted the rotatable parts of the automatic timers indicated at 59, 60 and 61. The motor, through another branch of the gear train 56, constantly rotates a shaft 62 on which are rigidly fastened the cams of the regular cam contacts 63 and the cams of the switch bar controlling jacks 64, 65, 66, 71, 72 and 73. The regular cam contacts 63 are of the type usually adopted in machines of this type as illustrated typically in Fig. 23 and consist of spring contacts opened and closed by their associated cams at predetermined points in every machine cycle.

The jacks 64 to 66 and 71 to 73 which will be described in detail hereinafter, each consists of a cam for depressing a rod during machine operation which, through a suitable bell crank, shifts a switch bar carrying a plurality of control contacts into and out of circuit closing position. The jack 65, which is shown partly in section, has a cam 74 which in the home or D position of the machine depresses a rod 75 rocking a bell crank 76 against the action of its biasing spring 78 and holding the switch bar 77 to the left which is its open circuit position. When the machine is in operation the low portion of the cam 74 permits the rod 75 to rise and the spring 74 rocks its bell crank counter-clockwise and shifts the bar 77 to the right into closed circuit position. The bar 77, which is the adding and listing switch bar is operated in every machine cycle in which there is no totalling and is permitted to remain in circuit closing position during that portion of the machine cycle in which the analyzing brushes are searching the entire active index point area of the controlling card.

The remaining jacks are similar to jack 65 in that they have a cam for depressing a rod to shift a switch bar but they differ from it in that they are not active in every machine cycle. During the cycles in which they are inactive a locking magnet holds their operating rod depressed so that the cams are ineffective. The jack 66 through its rod 81 and bell crank 82 controls the total printing switch bar 83 which is biased to open circuit position by the spring 84. An interlocking mechanism is provided between the switch bars 77 and 83, as with the particular circuit arrangement adopted, it is essential that the adding and listing bar be held in open circuit position whenever the total printing bar is in closed circuit position. This interlocking system consists of the bell cranks 85 and 86, pivotally connected to the bars 83 and 77, respectively, and the link 87 joining the two bell cranks. When the bar 83 is shifted to the right, into circuit closing position, the bell crank 85 rocks clockwise and holds the bar 77 to the left or in open circuit position. Thus in spite of the rotation of the cam 74, the bar 77 cannot close its circuits as long as the switch bar 83 is in circuit closing position. Interference between the normal operation of the bar 77 and the interlocking mechanism is prevented by a pin and slot connection at 88 which permits the bar 77 to be freely operated by its jack as long as the bar 83 remains in open circuit position. The operation of the grand total switch bar 91 by the jack 64, and that of the total switch bars 92 and 93 and the group indicating switch bar 94 by their jacks 64, 73, 71 and 72 respectively is substantially similar to that of the switch bar 83 except that no interlocking mechanism is required.

The constantly rotating shaft 62 has also fixed thereon the cam of a shifting mechanism 95 which through a link 96 serves to rock a total print control shaft to select total printing operations with or without reset of the accumulating units.

The card feed mechanism indicated generally at 100 is of the type usually employed in machines of this character and needs no detailed description. It is driven from the shaft 62 through a gear train 101, the last gear of the train being connected to the card feed shaft 103 through a one revolution clutch 102. The card feed cams 104, whose function is to control the opening and closing of control contacts during card feeding cycles and whose typical form is shown in Fig. 23, are fixed to the card feed shaft 103.

The mechanical and electrical details of the several new elements of the machine will first be described and then the complete operation of the machine explained in connection with the circuit diagram.

*Tabulation*

The operation and structural details of the accumulating mechanism may be clearly understood from Figs. 4, 5, 6 and 7 of the drawings. As previously explained this mechanism is divided into self contained replaceable units each corresponding to a single denominational order and each containing its own individual differential mechanism and controlling magnet. The view in Fig. 4 shows a complete unit (as at 52 in Fig. 1) inserted in place in the machine frame, the latter being shown in section to give an unobstructed view of the accumulating unit.

Each unit 52 is mounted on an individual base plate 105 adapted to be slid into grooves 106 in the machine frame 108 and held in place by a retaining screw 107. The base plate of the unit has a contact block 109 mounted in one corner carrying contacts which engage cooperating spring contacts on a contact block 110 permanently mounted in the frame 108. This construction permits the placing of the unit in its grooves to automatically make the proper electrical connections to the machine circuits. The placing of the unit in the machine frame also insures proper operative driving connections with the tabulating shaft through mechanism which will now be described.

The tabulating shaft 51 as shown in Fig. 1 is constantly rotated by the motor 50 as long as the latter is inoperation. This shaft 51 (Figs. 4, 5 and 6) has bevelled gears 111, one for each accumulator unit, mounted thereon, suitably spaced by sleeves 112 to locate each bevel gear in position to engage the driving pinion 113 of an accumulating unit. The sleeves, bevel gears and shaft are rigidly connected together to rotate as a unit. This structure is somewhat long as it extends across the entire bank of accumulating units and additional supports for the shaft are provided in the form of rollers 114 mounted on the accumulating units and bearing against the sleeves 112 intermediate the bevel gears.

The driving pinion 113 of the accumulator unit is fixed to a shaft 115, which likewise rotates as long as the driving motor is in operation and is supported in bearings 121 and 122. Rigidly fixed on the shaft 115 is a sleeve 123 having an enlargement 125 at one end with clutch teeth 126 formed on its face. A second sleeve 127, freely mounted on the shaft 115, corresponds to the usual counter element, although in the present case the usual visual indicating characters are not marked on it. The sleeve 127 on its end adjacent the sleeve 123 has an enlargement 132 with teeth 133 formed on its face to cooperate with teeth 126. The sleeve 127 is free to slide on the shaft 115 and by mechanism which will be described hereinafter may be shifted so that the teeth 126 and 133 engage whereupon the sleeve 127 will rotate with the shaft 115. This mechanism constitutes a clutch by means of which data on the controlling records may be entered and accumulated on the counter element 127. The enlargement 132 on the sleeve 127 is provided at its end opposite the clutch teeth with a bevelled surface formed into teeth 134 which, when the sleeve is in normal unclutched position, are engaged by a pivoted latch 135 biased to engage the teeth by a spring 136. When the sleeve is moved to clutching position the latch is held out of engagement with the teeth 134 by a stop pin 137. This permits the sleeve 127 to rotate freely when the clutch elements are engaged but holds it firmly in any position when they disengage.

The shifting mechanism for the member 127 consists of a forked lever 150 pivoted at 139 and having two arms 140 and 138 of which the latter is bifurcated and has its tines located in an annular groove 141 in the enlargement 132. The lever 150 is also provided with an extension having a struck down portion 144 against which presses one end of a spring 142 whose other end is anchored at 143. This spring is held under tension by a pivoted rock lever 148 one of whose arms rests in a notch 149 formed in the printing control rock shaft 147 and the other arm of which forces a struck up extension 145 on a lever 146 against the spring. During tabulating the position of parts is as shown in Fig. 4, in which the rock shaft 147 constantly holds the lever 148 in position to tension the spring. The tensioned spring 143 constantly biases the lever 150 for counter-clockwise rotation thus tending to shift the member 127 into clutch engaging position. This shifting is normally prevented by a latch 158 pivoted at 159 and biased for clockwise rotation by a spring 160. The latch normally rests under the arm 140 and prevents rocking of the lever 150.

The tabulating or counter magnet 151 has its armature 152 pivoted at 153 and normally urged away from the magnet cores by the same spring 160 which biases the latch 151. The armature supporting structure has an extending arm 154 whose end abuts a tail piece 155 on the latch 158. When the magnet is energized its armature is attracted and the arm 154 rocks the latch about its pivot releasing the shifting lever 150, which thereupon shifts the member 127, permiting the clutch teeth 126 and 133 to engage and causing the member 127 to rotate with the shaft 115. The energization of the tabulating magnet is instantaneous and the latch 158 is immediately released, but it cannot engage under the arm 140 at once as the shifting lever has now been shifted and the latch impinges on the end of the arm 140. The clutch remains engaged and the member 127 continues to rotate until a cam 131 (Fig. 6) on the sleeve 124, rigidly fastened to the sleeve 123, strikes a projection 161 on the arm 140 and shifts the lever 150, whereupon the clutch disengages and the latch 158 again slips under the arm 140. The member 127 comes to rest being held positively in its new position by the latch 135.

The machine parts move synchronously with the feed of the record cards past the analyzing brushes; thus the shaft 115 rotates the sleeve 123 with its enlargement 125 at such a speed that the latter moves a distance equal to the width of a tooth space while the analyzing brushes are covering a distance equal to the spacing between centers of adjacent index point positions. The clutch engages when or shortly after the analyzing brush encounters a perforation in the card and the cam 131 is so located that the clutch is disengaged as the analyzing brush is passing the zero index point position of the card. The member 127 then rotates through a number of tooth spaces equal to the numeral represented by the perforation in the card. Thus if there is a perforation in the six index point position the clutch will engage when the analyzing brush encounters the six index point position and will be disengaged, after moving the member 127 through six tooth spaces, when the brush passes the zero index point position. If there is a perforation in the zero index point position the counter magnet will be energized and the member 127 will be shifted. The cam 131, however, will immediately shift it back to normal position before the clutch teeth have a chance to actively engage. There will thus be no movement of the counter element in response to a perforation in the zero position. During tabulating operations the movements of the counter element are cumulative for successive cards and at the end of a group of cards the position of the counter element will correspond to the sum of the numerals represented on the different cards, in other words the position of a counter element may represent a single item or the sum of a plurality of items.

It may be noted that the clutch teeth 126 and 133 are shaped so that extreme accuracy of adjustment of the counter elements is unnecessary. Each tooth consists of a surface normal to the face of the member on which it is formed joined by a sloping surface. The clutch members are not actively engaged until the normal surfaces of opposing teeth are in contact and the energization of the counter magnet may be timed almost a full tooth space or index point ahead of the time of active engagement of the clutch members.

*Transfer*

This machine, as mentioned above, operates at high speed for printing as well as tabulating and the usual mechanical transfer mechanisms are not suited to this type of operation. The electrical transfer system described in the U. S. patent to Lake 1,372,965 has therefore been applied to the machine, as will now be described, and has been found to be extremely appropriate to the high speed service required.

Transferring is required whenever an adder element or wheel, in accumulating successive items, passes through zero, as in this case it is necessary to enter one unit in the accumulating element of the next higher denominational order. The necessity for this operation may arise under two different sets of conditions; first, when the accumulating element into which the carried unit is entered stands in any except the nine position and, second, when this accumulating element stands in the nine position. In the first case the entry of the unit in the accumulating element of the next higher order ends the transfer. If this accumulating element stands in the nine position, however, the entry of the carried unit will in itself cause it to move to zero position and it is then necessary to enter a unit in the accumulating element of the next higher order. The latter case involves at least three accumulating elements in the transfer operation. In the electrical transfer system the extra unit, which is carried from one accumulating element to the next, is not entered as soon as the element of the lower order passes through zero, but all transferring operations necessitated during a machine cycle are carried out simultaneously on all elements involved during the latter part of the cycle after the analyzing brushes have cleared the active index point area of the controlling card. Each counter element which passes through zero during a cycle prepares an electric circuit to the counter magnet of the accumulating element of the next higher order and any counter element which stands in the nine position at the end of the accumulating portion of the cycle prepares an additional circuit to the counter magnet of the accumulating element next higher in order to itself. This latter circuit, however, can only be energized through the transfer circuit of the accumulating element next lower in order to the accumulator which stands in the nine position. It will therefore not be energized in the absence of a carrying operation to the accumulating element which stands in the nine position. The prepared circuits are energized with a single pulse of current during the latter portion of the cycle energizing the proper counter magnets and causing the simultaneous carrying of a unit to all the accumulators involved in this phase of the transfer operation.

The electrical arrangement and operation of the transfer circuits may be understood best from Fig. 31 which is substantially a duplicate of the lower right hand corner of Fig. 30A except that the three upper accumulator units only are illustrated and they are directly connected for transferring from the lower order (unit 1) to the serially adjacent higher orders (units 2 and 3). The panel board and all circuits not directly concerned in the transferring operation have been omitted to avoid confusion. Each counter unit is provided with a counter magnet and three transfer contacts, the magnet of unit 1 being designated at 151 and the transfer contacts at 163, 164 and 165 respectively. Mechanism which will be described later bridges contacts 164 and 165 when the counter element passes through zero and the bridge is maintained until the latter part of the cycle. Contacts 163 and 164 are bridged if the counter element comes to rest in the nine position at the end of the cycle. The corresponding contacts of units 2 and 3 will be similarly bridged under like circumstances in connection with these units. The intermediate contacts 164, 264 are connected to the counter magnets 251, 351 respectively of the units of the next higher denominational order and the intermediate contact of unit 1 is likewise connected to the lower contact 263 of unit 2. The upper contacts 165, 265, 365 are each connected to a common energizing line over which a single pulse of current is sent under control of a cam contact C F 1 during that portion of the cycle in which the bridges across the several contacts are maintained. It may be assumed by way of example that during a certain cycle the adder element of unit 1 passes through zero, making it necessary to carry one unit to unit 2 and incidentally bridging contacts 164 and 165 and the adder element of unit 2 stands at nine, making it necessary to carry one unit to the adder element of unit 3 on the transferring operation and incidentally bridging the contacts 263 and 264. When the cam contacts C F 1 close, a circuit will be momentarily completed through counter magnet 251 across contacts 165, 164 thus carrying the extra unit to unit 2 and the counter magnet 351 will be momentarily energized through the contacts 165—164 and 263—264 thus carrying the required extra unit to unit 3. The transfer contacts of the remaining units of the accumulating bank are wired in a similar manner and a transferring operation may involve any number of them and will be identical to that just explained. All the upper contacts 165, 265, etc. are connected in parallel to the energizing line and a transferring operation may be initiated on any unit. Furthermore the bridging of the lower contacts 263—264, 363—364 etc. has no effect unless the upper contacts 164—165, 264, 265 of the unit of the next lower denominational order are also bridged during the same cycle. In other words there will be no carrying from an accumulating unit whose counter elements stands at nine at the end of a cycle unless the added element of the next lower denominational order passes through zero during the same cycle.

The mechanical devices for properly bridging the transfer contacts will be explained in connection with Figs. 4 to 9, 11 and 12 of the drawing. The transfer contacts 163, 164 and 165 are mounted in the insulating block 109 (Fig. 4) and are adapted to be bridged when necessary by a wiper contact 166 mounted on an arm 167. The relation between the contacts and the wiper may be most clearly seen in Fig. 11. The arm 167 is mounted on and insulated from a pivoted member 168 biased for counterclockwise rotation by a spring 170. The arm, if permitted to rotate will cause the wiper 166 to successively bridge contacts 163—164 and 164—165. It is released for this bridging action by mechanism controlled by the accumulator, which mechanism will now be described. Referring to Figs. 4 to 7, the counter element 127 of the accumulator at its end opposite the clutch portion is formed into an elongated gear 171 meshing with a crown gear 172 (Fig. 6) formed on the rear face of a rotatable disk 173. The teeth of gear 171 are long enough to mesh with the crown gear regardless of whether the counter element is in clutched or unclutched position, thus causing the disk to rotate whenever the counter element rotates. The disk is provided with a number of cam projections 175 which are spaced apart so that the disk will move through the angular distance from one projection to the next when the counter element is moving to register ten units. When the counter element is in a zero position the disk is positioned as in Fig. 4. Transferring is controlled by the cam projections 175 through a lever 181 pivoted at 182. This lever has an arm 183 extending into proximity to the path of travel of the cams 175 and is provided at its free extremity with a double cam surface 184 to coact with the cams. The lever 181 is also provided with an arm 185 in which are formed two notches 186 and 187 in the first of which normally rests an extension on the arm 191, integral with member 168 and holding the latter against the action of spring 170, and in the second of which normally rests an extension on a lever 192 pivoted on member 168 and biased for counterclockwise rotation by a spring 193. The configuration of this lever system will be clear from a joint consideration of Figs. 4 and 12 of the drawings. The coaction of the notches 186 and 187 with the arms 191 and 192 when the lever 181 is in normal position as in Fig. 4 holds the wiper contact 166 out of engagement with the transfer contacts.

When the counter element 127 reaches a nine position the first portion of the double cam surface 184 is encountered by a cam projection 175 and the arm 183 cammed slightly outwardly rocking the lever 181 and releasing arm 191 from the notch 186 whereupon the spring 170 rocks the member 168 and permits the wiper contact 166 to bridge the transfer contacts 163, 164. The notch 187 being slightly deeper than 186 does not release the arm 192 on this first camming action and the arm 191 merely moves against the arm 192 and is held there, maintaining the wiper contact in engagement with the transfer contacts 163, 164 as long as the counter element registers nine. This position of parts is illustrated in Fig. 8 of the drawing. If the counter element then moves to zero position the disk 173 will rotate a slight additional distance and the cam projection 175 will ride under the second portion of the cam surface 184 rocking the lever 181 a slight additional distance and releasing the arm 192 from notch 187, thus permitting additional movement of the arm 191 under the action of spring 170. The arm 191 is slightly longer than the arm 192 and merely moves over against the side of notch 187 permitting the wiper 166 to engage transfer contacts 164, 165 as indicated in Fig. 9. The lever and contact system remains as positioned until positively restored, as the extension on the end of the arm 192 now abuts the end of lever arm 185 and prevents spring 193 from returning the lever 181 to normal position.

The energization of the counter magnet 151 under control of the transfer contacts as explained in connection with Fig. 31 causes shifting of the counter element 127 to cause engagement of the clutch teeth 126—133 and the counter element thereupon rotates an angular distance of one tooth space or point being disengaged by the projection 128 on sleeve 124 striking projection 161 on shift lever arm 140.

The restoring mechanism consists of a member 201 pivoted at 169 on which are mounted two pins 202 and 203, the former engaging the edge of the arm 191 but being short enough to pass freely under arm 192 and the latter engaging the edge of arm 192. The pivoted member 201 is connected by a link 200 to a rock lever 199 whose free end rides on the end of sleeve 124 fixed to shaft 115. The end of this sleeve has a cam surface 197 and projection 198 thereon coacting with the end of lever 199. The arms 191 and 192 on moving to permit the wiper 166 to engage the transfer contacts, push the pins 202 and 203 ahead of them rocking the member 201, the resulting movement of the link 200 and lever 199 during this portion of the cycle being permitted by the low cam surface 197. After the completion of the necessary transferring operations as explained above, the projection 198 encounters the end of lever 199 and rocks it counterclockwise which movement through the link 200 is converted to a clockwise movement of the member 201, whereupon the pins 202 and 203 restore the arms 191 and 192 to normal position and the spring 193 rocks the lever 181 reseating the arms in the notches 186 and 187.

Printing

The printing mechanism (Figs. 2, 15 and 16) is of the rotary drum type substantially similar to that fully described in my U. S. Patent No. 1,516,079 although the details of the call and control system have been changed in some degree as will be clear from the following description. The printing drum 54 carries a plurality of circumferential rows of type 211 mounted on pivoted carriers 212. Ordinarily one row is provided for each column of the controlling cards and each row contains a type for printing each character which may be represented by the index points in the record columns and additional type for printing special characters which may be desirable under certain circumstances such as total marks or asterisks. Only one row of type has been illustrated in the drawing but it will be understood that the control and operation of the other rows is identical with that of the single row shown.

A locking cam 213 is provided for each type carrier to hold it positively against rotation about its pivot except when it is in printing position. These cams consist of cylindrical members or disks 213 provided with a notch 214. They are rotated in synchronism with the drum by gear trains (not shown) so that each cam makes one revolution for each revolution of the drum and so that the notch will release the type carrier for possible printing operations whenever it reaches printing position. Each type carrier has a cam surface 215 concentric with the periphery of the cam disk 213 when the carrier is in normal inoperative position. During that portion of the cycle when the carrier is out of printing position the cylindrical surface of the disk 213 rides under the cam surface 215 and holds the carrier firmly against rotation as shown in connection with the left hand type carrier in Fig. 15. When a carrier reaches that position in which rocking about its pivot would cause its type to strike against the platen roll 218, the notch 214 in the locking disk releases the carrier so that it may be rocked about its pivot to cause its type to print.

The printing call mechanism for each row of type is controlled by a printer magnet 221 having an armature 222 provided with an extension abutting a call rod 223 which in turn abuts one arm of a lever 224 and rocks it counterclockwise against the action of the compression spring 225 when the armature is attracted by the magnet. The lever 224 is provided in its oppositely extending arm with a notch 227 which in the absence of a printing operation engages and holds the end of an arm of lever 228 biased for clockwise rotation by a compression spring 229. An oppositely extending arm 230 of lever 228 is provided with a cam surface 231 and carries a dog 232 biased for rotation by a spring 233, the rotation being limited by suitable coacting lugs on the lever arm 230 and the dog. When the parts are in normal non-printing position as shown in Fig. 2 the dog rests against the tip of lever 234 which carries a finger 236 having a hook 237 at its end for engaging projections 217 on type carriers 212. The lever 234 has a coacting compression spring 235 which ordinarily holds the hook 237 out of the path of extensions 217.

The proper magnet 221 is energized instantaneously to effect printing. The magnet attracts its armature 222 which, through its extension, forces call rod 223 to the right rocking lever 224 about its pivot and releasing lever arm 228 from the notch 227. The lever 228 is rocked by its spring 229 and the biased dog 232 in descending snaps under the lever arm 234 as shown in Fig. 15. Shortly after this the tail projection on a type carrier behind that one which is to print engages the cam surface 231 and forces the lever arm 230 with its pivoted dog 232 upward, rocking lever 234 and forcing the hooked end 237 of finger 236 into the path of the tail projection 217 of the type carrier by which printing is to be effected. The drum in rotating forces the projection sharply against the hook 237 and the impact causes the carrier to turn about its pivot and force the type against the platen roll. A slight additional movement is thereafter imparted to the arm 230 owing to the continuing coaction between the cam surface 231 and the tail piece 217 and the dog 231 slips off the end of arm 234 as shown in Fig. 16 and, as the magnet 221 is now de-energized and its armature released, the end of the arm 228 is again latched in the notch 227. Incidentally the arm 234 having been released by the dog 232 is rocked by its spring 235 to inoperative position. The parts are thus restored to the position shown in Fig. 2 in readiness for a subsequent printing operation.

This printing operation involves a type carrier in addition to the one from which printing is actually effected, to cam the lever 230. Referring to Fig. 2 it will be noted that the last two type carriers of the group, designated as 295 and 296, have no carriers properly positioned behind them to cooperate with the cam surface on the lever 230. Two discs 297 and 298 provided with projections 299 and 300 respectively are therefore mounted on the drum to perform this function.

Referring to Fig. 2 it will be noted that several printer magnets 221 have been blocked in in dotted lines. Each of these controls a row of type in the manner just explained and each is offset from its neighbor normal to the plane of the drawing just sufficiently to permit a direct straight line alignment of its call rod and printing control lever.

Listing

Listing or printing of each recorded item by the present machine is controlled directly from the lower analyzing brushes without the intervention of any instrumentalities associated with the accumulating devices. Referring to Fig. 30A of the drawing the second printing magnet 221 from the right is wired to list items analyzed on record cards by the second analyzing brush from the right. The listing circuit extends from this analyzing brush through wire 238 to socket 239, thence through jumper 240 and the adding and listing switch bar 77 to socket 241 and through jumper 242 to socket 243, thence through wire 244 to printer magnet 221. This is the circuit through which the printing magnet gets its current impulse for listing and it will be noted that it is entirely independent of any other operative circuit of the machine. That is a printing magnet may be connected directly to an analyzing brush to list the items analyzed thereby and it is not necessary that this brush control any accumulator. It is quite possible of course to control an accumulator from the same brush, if desired, but in this case the listing circuit and the accumulator control circuit will be wired in parallel with each other as will appear later and the operation of the printing device as a lister will still be entirely independent of the accumulator.

The drum 54 rotates in synchronism with the feed of the record cards past the analyzing brushes so that each type reaches printing position shortly after its corresponding index point position on a record card reaches the analyzing brush. When a brush encounters a perforation a pulse of current flows the circuit just traced energizing the printer control magnet and setting the operating finger to engage the proper type carrier and cause printing immediately thereafter.

Total printing

Total printing is controlled by the accumulator units through contacts 245—246 mounted in contact block 109 (Fig. 4). The contacts which are insulated from each other form a break in the total printing circuit which may be bridged when total printing is required by a wiper contact 247 mounted on an arm 248 fixed to and insulated from a member 249 pivoted at 250. The cooperation of the contacts and wiper may be most clearly understood from the isometric view in Fig. 13. The pivoted structure carrying the wiper is urged to non-contacting position by the spring 136 which also serves to bias the latch 135 as heretofore explained. The pivoted member 249 has a cam projection 252 which in non-contacting position of the wiper lies in the path of travel of the cam disc projections 175. The projection 252 is located so that it will be engaged by one of the projections 175 just before the counter element 127 reaches one of its zero positions. The member 249 and wiper 247 are then raised causing the wiper to bridge the contacts 245—246. It will be noted that when the parts have actually reached zero position as illustrated in Figs. 4 and 14 the member 249 is no longer supported by the projection 175 and tends to immediately return to its non-contacting position. The inertia of the pivoted structure and the wiping contact between the wiper and contacts 245—246, however, hold the printing circuit closed at this point for a brief interval after the parts have reached zero position and during this interval a pulse of current is sent through the printing circuit to energize the printing magnet, causing it to select the proper type as explained above under Printing. The counter element 127 may be arrested in zero position to clear the accumulator or it may be permitted to rotate until the original item has been reentered thereon and then arrested to hold the printed total on the accumulator. These operations will be explained in detail hereinafter.

The total printing operation is initiated by energizing the counter magnets 151 of all accumulators from which printing is desired simultaneously shortly before the nine type on the drum reaches printing position. This causes all the clutches to engage simultaneously rotating the counter elements and as each of the latter reaches zero position the printing circuit will be closed as explained above. This arrangement always selects the type for printing which represents the item standing on the counter element at the time the clutches engage. For example, if a certain counter element registers 7 it must turn through its 8 and 9 positions to reach zero. In the meanwhile the printing drum has successively carried the 9 and 8 type through printing position and the 7 type will be selected as the counter reaches zero.

*Total printing with accumulator reset*

The accumulators may be restored to zero, or more strictly speaking arrested in this position, when they effect total printing by rocking the notched shaft 147 (Fig. 4) to the position shown in Figs. 10 and 14. The lever 148 is then released and no longer tensions the spring 142. The spring is tensioned for the time being by the lever 146, one of whose arms normally rests on the end of an arm 177 of lever 181 and forces the struck up portion 145 on the other arm of lever 146 against the spring. The spring thus tends to force the counter element clutch member into engagement as long as the arm 177 remains in the position shown in Fig. 4. The clutch therefore engages when the counter magnet 151 is energized at the beginning of totalling and remains engaged until the counter element reaches zero. Just before the counter reaches this position the lever 181 is rocked by the action of one of the projections 175 on the cam surface 184 and the arm 177 slips from beneath the arm of lever 146 releasing the tension on the spring 142. The spring thereupon straightens and causes lever 146 to rotate slightly forcing the struck up portion 145 against an arm 291 on the clutch shifting lever 150 and locking the latter to disengage the clutch. The counter element is thus arrested in zero position and remains there owing to the action of latches 135 and 158. The arm 177 cannot reengage under the arm of lever 146 owing to the rocking of the latter until the rock shaft 147 is shifted back to tabulating position as shown in Fig. 4. This shifting rocks the lever 148 forcing one of its arms against the struck up portion 145 of lever 146, rocking the latter to permit the arm 177 to again engage under its arm and incidentally tensioning the spring 142.

The shaft 147 is rocked automatically to select the different types of printing by means of the mechanism shown in Fig. 3. The shaft is provided at its ends with supporting trunnions 272 to one of which is rigidly attached an arm 273 to rock the shaft. The arm 273 is joined by a pivoted link 96 to a lever 274 pivoted at 276 and provided with a rearward extension 277 on which is mounted a cam follower 278. A spring 284 tends to elevate the arm 274 and rock the shaft 147 to the total printing with reset position shown in Fig. 10. This rocking is normally prevented by a latch 281 which engages a projection 285 on lever 274 and holds it against the action of spring 284. The latch is normally held in latching position by a member 287 which takes under it and is fastened to the pivoted armature 282 of magnet 283. As long as this magnet remains unenergized the latch holds the parts in the position shown with the shaft 147 in tabulating position as in Fig. 4. Energization of the magnet 283 causes it to attract its armature 282 and rock the member 287 from beneath the latch 281. The angle of the contacting surfaces of the latch and the projection 285 is such that when the latch is thus released the projection 285 may slide off of it and permit the lever arm 274 to rock clockwise under the force of spring 284 and through link 96 and arm 273 to rock shaft 147 to the position shown in Fig. 10. The rocking of arm 274 lowers the cam follower 278 to engage the surface of a cam 290 fixed on the constantly rotating shaft 62 and toward the end of the cycle the high portion of this cam rocks the arm 274 back to the position shown in Fig. 3 whereupon, as the magnet 283 is now deenergized the spring 286 causes the latch 281 to engage projection 285 and member 287 to again ride under the latch to lock it in latching position. The parts remain thus until the magnet 283 is again energized. The magnet 283 is under control of the total timer and as will be explained later the shaft 147 is caused to rock to its total with reset position during certain totaling cycles and to return to its normal tabulating position during other totaling cycles, thus permitting selected accumulating banks to clear and others to retain their printed totals.

*Total printing without accumulator reset*

It may be desirable to print totals standing in the accumulating elements and retain the totals on the banks after they have been printed. This is accomplished by turning the counter elements through an angular distance of ten teeth or points thereby, in effect, first restoring them to zero and immediately reentering the original items. The printing and printing control in this case is substantially similar to that described under "Total printing" and "Total printing with accumulator reset"; that is the counter magnets are all energized simultaneously to effect clutch engagement shortly before the printing drum reaches the 9 position the total control contacts 245—246 are bridged by the wiper 247 when the counter element reaches zero. The printing is done in this case while the counter element is in motion and passing through zero position and it continues its rotation until it has covered an angular distance of ten teeth.

The rock shaft 147 remains in the position shown in Fig. 4 forcing the lever 148 against the struck-up portion 145 of lever 146 and forcing the latter against spring 142 constantly tensioning it. It may be remarked that although the lever 181 will be rocked as the counter element passes through zero, this actuation will not affect the machine operation as the lever 146 which coacts with arm 177 of lever 181 is held by the lever 148 during the totaling and restoring operation. After the clutches have been engaged just before the printing drum reaches the nine position they remain engaged until the counter element revolves through ten teeth spaces or points and are then kicked out by the engagement of projection 131 on sleeve 124 (Fig. 6) with projection 161 on the shift lever 150 (Fig. 4). The counter element 127 is thus shifted to the position shown in Fig. 4 and is latched by the latch 135 again registering the original item. The shift lever 150 is of course latched by the latch 158 which rides under its arm 140 as soon as it has shifted the clutch members out of engagement.

The same projection 131 on the sleeve 124 (Figs. 4 and 6) serves to disengage the clutch for both tabulating and total printing without reset although the counter element need move a maximum distance of only nine tooth spaces in the former case and must always move a distance of ten tooth spaces in the latter. This is accounted for by the different timing in the two cases. During tabulating the earliest point in the cycle at which the counter magnet impulse can occur is when the analyzing brushes are searching the nine index point position or in other words shortly before the nine type on the drum reaches printing position. During total printing without reset, however, while the counter magnet impulse must still be timed before the printing drum reaches the nine position it is timed a full point ahead of the earliest possible tabulating impulse to cause rotation of the counter element for ten tooth spaces instead of a maximum of nine.

Zero and special character printing

All zeros are printed through a control system independent of the analyzing brushes and the accumulator units, and the usual total marks, such as asterisks, etc., used to distinguish printed totals from listed items are printed through the same control system. The system will be described briefly in the present case as it is fully described and claimed in my copending application Serial No. 147,766 filed November 11, 1926. A clear idea of the principle of operation of the system may be obtained from the circuit diagram in Figs. 30 and 30A in which five zero and special character printing control devices are shown at 292. The showing is very diagrammatic to indicate clearly the relationship between the contacts of the several units. The mechanical structure will be described more or less in detail later. Each unit comprises a plurality of contacts 571 to 575, inclusive, and two double arm switch levers 576 and 577, of which lever 576 is controlled manually and lever 577 automatically by the printing mechanism. The contacts 573 and 574 are shown as consisting of a plurality of contacts electrically connected although in the physical embodiment of the unit they each comprise a unitary metallic part. The manually operated switch lever 576 is movable to three positions in one of which it bridges the contacts 571 and 572, in another of which it bridges the contact 574 to the contact 573 of the adjacent unit to the right and in the third of which it is in neutral and bridges no contacts. The contact 571 of each unit may be plugged through a wire 244 directly to any printing magnet 221. An energizing pulse for zero printing is applied once each cycle to the contacts 575 through a wire 578 controlled by cam contacts R21 which close instantaneously during the latter portion of each machine cycle. An energizing pulse for the total character mark is applied to each contact 572 through a cam contact R16, which closes once each machine cycle, and a contact F—X on the total timer. The contact F—X is closed whenever a total is printed under the control of this timer and consequently all the contacts 572 are energized instantly during the latter portion of each total printing cycle.

The circuits through the wires 244 are interrupted during the digit printing portion of the cycle by cam contacts 624 to prevent cross circuits between the several printing magnets during this portion of the cycle.

The unit 292 to the extreme right has its lever 576 in the total character printing position, that is, the upper arm of switch member 576 bridges contacts 571 and 572. Upon energization of the contact 572 under control of the contacts F—X and R16 an operating impulse will be delivered to the printer magnet 221 plugged to this unit over the wire 244. This impulse is properly timed to cause printing by the total character mark type on the printing drum. A control unit 292 which is plugged for total mark printing should be entirely disconnected from any other control unit. Its own switch bar 576 on being moved to the position shown in the unit on the extreme right automatically breaks the circuit between its contact 574 and contact 573 of the next units to the right. The switch bar 576 of the unit to the left of one which is to print a total mark should be in neutral position as shown in the case of the second unit 292 from the right in the drawing.

Zero printing is controlled by the switch arm 577 which is operated by the type actuating mechanism. A zero should be printed in any denominational order to the right of the first significant figure of a number in which no significant figure is printed. The printing of the zeros then is controlled by the presence of a significant figure in the adjacent column to the left and by the absence of a significant figure in the column itself. Furthermore, it may be necessary to print zeros in several successive columns to the right of a significant figure.

The units 292 may be plugged to any printing magnets 221 through the wires 244, although adjacent control units 292 must be chosen for magnets representing adjacent denominational orders. That is, in the wiring diagram, if the four left hand units 292 are to control zero printing in connection with numbers containing four denominational orders, the extreme left hand unit will be plugged to the thousands magnet, the next to the hundreds magnet, the next to the tens magnet and the last to the unit magnet. In this arrangement also the levers 576 of each of the three left hand units must bridge its own contact 574 to the contact 573 of the adjacent unit to the right. The normal position of the switch arms 577 is as shown in the drawing, and as long as these levers are not disturbed no zero printing can occur as the contact 575 of each unit to which the energizing pulse is applied is disconnected from any other contact. If the magnet corresponding to the unit to the extreme left prints a significant figure during a cycle, the lever 577 will be rocked from the position shown to an alternative position causing its lower arm to bridge the contacts 574, 575 of this unit and break the connection between contacts 574 and 571. The zero pulse in this case will cause current to flow through the lower arm of the switch lever 577 to contact 574 of this unit and thence through switch lever 576 to the contact 573 of the second unit which through its switch arm 577 is connected to contacts 574 and thence through contact 571 and wire 244 to the printing magnet 221 connected to this second unit causing it to print zero. The contacts 574 and 573 of the second and third units respectively are also bridged by the switch element 576 of the second unit and the zero impulse will likewise be applied to the printer magnet 221 connected to the third unit unless the switch lever 577 of this third unit has been rocked by its printing type. This will occur, of course, if the printer magnet connected with the third unit prints a significant figure during the cycle, in which case its printing control circuit will be broken at the contact 573. This circuit arrangement permits zeros to be printed in any number of successive columns to the right of the significant figure and no zeros can be printed to the left of the first significant figure of the number.

The total mark type 579 and zero printing type 580 respectively are shown on the drum 57 in Fig. 2 spaced somewhat from the digit type allowing several points between the printing of the last digit and the printing of either the cipher or total mark thus allowing plenty of time for the setting of the printing control circuits. Two extra operating discs 581 and 582 are provided for the operation of type 579 and 580 as in the case of the first and second digit type.

The physical construction of the zero and special character printing control devices indicated at 292 in the circuit diagram is shown in Figs. 25 to 29, inclusive. Fig. 26 shows a unit inserted in the machine and with one of its cover plates removed to disclose the operating mechanism. This unit consists of two side plates 589 preferably of insulating material on which are mounted the contacts 571, 573, 574 and 575. These contacts are all spaced from each other and with the exception of contact 575 are all insulated from each other and from all contacts of adjacent units. The contact 575 has a looped tongue portion 593 (Figs. 26 and 29) adapted to contact with a similar portion on the corresponding contact of the adjacent units on both sides of it. In Fig. 26 contacts 571 and 573 and 575 are shown in full lines and the outline of contact 574 is shown in dotted lines so that the configuration of these contacts is distinguishable. The switch levers 576 and 577 are pivoted between the cover plates 589. The switch lever 576 is movable to three positions indicated by the dot-dash-lines A, B and C. The A position is the zero printing control position and here a projection 592 on the switch lever bridges the contact 574 of its own unit and the contact 573 of the next adjacent unit, an opening 594 being provided in the cover plates for this purpose. This is the position in which the switch lever is shown in Fig. 26. The C position, in which this switch lever is shown in Fig. 25, is the special character printing position and here arm 591 on the switch lever connects the contact 571 with a wire 572 extending through the casing of each control unit. Contact with wire 572 is effected through a sliding piece 595 mounted on the switch lever and guided between flanges thereon and limited in its movement by a slot 596 through which the pivot of the switch lever extends. The sliding member 595 is urged by a spring 597 to firmly engage wire 572 when the switch arm is in the C or total mark printing position. Intermediate the A and C positions is a third position for the switch member 576 indicated by the dot-dash line B in which the member is in neutral and engages with no contacts as shown in Fig. 27. The switch member is held impositively in each of these positions by a struck-up tongue 590 coacting with slots 598 in one of the cover plates 589, (Fig. 28).

The switch lever 577 is likewise pivoted between the cover plates 589 and has two bridging extensions 599 and 600 insulated from each other. In the position shown in Fig. 26, which is the active or printing position of the lever, the projection 600 bridges the contacts 574 and 575 and in the alternative position the extension 600 bridges contacts 573 and 574 and the projection 599 bridges the contacts 574 and 571. The operation of these contacts and switch levers in controlling the printing circuits has just been explained in connection with Fig. 30 of the drawing.

The control units are insertable in slots 587 in the machine frame 108 so that the extending end of lever 577 coacts with the end of the lever 586 operated by the printing mechanism as will be explained hereinafter. An aperture 601 is formed in the machine frame 108 opposite each unit and fitted with an insulating sleeve 602 through which a plug 603 attached to the printing control wire 244 may be inserted to engage the contact 571. This permits any control unit to be connected to any printer magnet.

The operation of the lever 577 will be understood from Fig. 15 in which the lever 577 is shown in inactive position. The lever 586 is suitably supported in slots in a bracket 604 attached to the machine frame 108 and has a projection 605 bearing against a cam shaft 606. An extension of the arm 586 rests above the lever 234 carrying the printing finger. During the adding part of the machine cycle the high portion of cam shaft 606 is presented to the extension 605 and if the printing finger is rocked to engage a type carrier during this portion of the cycle the bar 586 will pivot above its extension 605 and force the switch lever 577 to active position to cause zero printing, if necessary, in the adjacent denominational column. The constantly rotating shaft 607 provided with extension 608 restores the switch lever 577 to normal inactive position toward the end of the cycle. Whenever a printing finger 236 is rocked during a cycle to effect printing of a digit the lever 586 will likewise be rocked to properly position switch arm 577 to cause zero printing in the adjacent column unless a digit is also printed in this column in which case the switch lever 577 corresponding to the latter will likewise be rocked, opening its own zero printing circuit and preparing a circuit for printing zero in the next column, if necessary. During that portion of the cycle in which no digit printing occurs and in which the printing mechanism may be operated to effect zero printing the low portion of the cam shaft 606 is presented to the extension 605 on lever 586 removing the fulcrum from this lever and preventing operation of the switch members 577 by any printing finger in selecting a zero type.

Timers

It is the usual practice in machines of this type to control each machine cycle by control devices which are rendered operable either during the cycle itself or the one immediately preceding it; that is, all conditioning operations must take place not more than one cycle ahead of the operations for which they condition. If it so happens that the control cards have just been placed in the magazine it is necessary for the machine to operate through at least two cycles to feed the first card under the lower brushes before the machine will operate automatically. This is usually done by successive manual closings of the start key to separately initiate at least two machine cycles. This inconvenience has been obviated by providing timers for automatically controlling the machine through a plurality of successive cycles at the beginning of each type of operation. The timers govern the control circuits independently of any of the ordinary control devices of the machine and when once set in operation will properly control the machine until all conditions necessary to full automatic control are established. It is possible by merely pressing the start key once to set the timer in operation and the machine will then operate automatically regardless of the position of the control records with respect to the brushes. It has been found that timer control for six cycles will satisfy any condition which may arise at present in the machines and for the purpose of standardizing the timers all of them have been designed for six cycle operation, even though in some cases less than six cycles might be sufficient. It is understood, however, that the principle of timer control could be applied for any number of cycles either more or less than six.

The principle of operation of the timers consists in rotating a shaft once during the number of machine cycles for which the timer is to be in operation. In the present case this shaft will rotate once in six cycles of machine operation. The shaft through suitable cams closes contacts which obviously may remain closed during any of the six cycles of operation. The contacts are connected with the usual control circuits of the machine and control the closing of these circuits independently of the usual automatic control system. The timers are indicated generally at 59, 60 and 61 in Fig. 1 and are associated with the shafts 57 and 58 which are driven constantly by the gear train 56 as long as the motor 50 is in operation. The timers 60 and 61 are the starting timers and 59 is the total timer. The number of cams and contacts on these timers are different but their operation is substantially similar and a description of one will suffice for all, it being understood that the necessary changes must be made in the number of contacts and number and shape of the cams to adapt them to their different functions.

One of these timers is shown in detail in Figs. 20, 21 and 22. The timer shaft is shown at 301 (Fig. 20) carrying suitably shaped cams 302 which cooperate with pivoted levers 303 (Fig. 21) and cause them to open and close control contacts 304, 305 as required. The driving mechanism for the timer shaft 301 is shown most clearly in Fig. 22. The shaft 301 is driven by a ratchet wheel 306, rigidly attached to it, and a pawl 307. The pawl is mounted on a lever 311 freely supported on a shaft 312 and urged counterclockwise by spring 315. The lever 311 carries a roller or cam follower 313 which under the force of spring 315 is pressed against the surface of a cam disk 314 fast to the shaft 58. The shaft 58 as will be seen from Fig. 1, makes one revolution for each machine cycle and once each revolution lever 311 will be rocked by the cam. The ratchet wheel 306 is provided with six ratchet teeth and under operating conditions will be advanced the space of one tooth for each revolution of the shaft 58. In other words when the timer is started its shaft 301 will rotate once for six machine cycles. One of the ratchet teeth designated as 316 is longer than the others and the movement of the pawl 307 is not sufficient to permit it to slide off this tooth and engage the next one. As long as the timer shaft remains in the position shown in the drawings the pawl 307 merely rides up and down on the surface of this elongated tooth.

The operation of the timer is initiated by energizing the magnet 317 (Fig. 21) which thereupon attracts its armature 321 and rocks a latch lever 322 attached thereto from its latching position beneath the arm 324 of a lever 323 freely supported on the shaft 312. The lever 323 has a second arm 325 whose end extends into proximity to a cam 326 rigidly mounted on the shaft 58. The arm is ordinarily held out of the path of this cam by the latch 322. A third arm 328 on the lever 323 carries a pivoted pawl 329 and also is attached to the spring 327 tending to rotate the lever about its pivot. The pawl 329 coacts with a notch 332 in a disc 331 rigidly mounted on the timer shaft. When the lever 323 is in latched position as in Fig. 21 the nose of pawl 327 rests on the brink of notch 332. Energization of the magnet 317, by rocking the latch lever 322, releases the lever 323 and as soon as the cam 326 clears the end of the arm 325 the lever is rocked by the spring 327 and the pawl 329 engages the notch 322. The cam 326 in its next rotation strikes the end of arm 325 and rocks the lever 323 against the force of spring 327, thus imparting a slight rotation to the notched disc 332 and the attached timer shaft 301. The lever 323 is relatched by the latch 322 as the starter magnet 317 has now been deenergized and the position of the starting mechanism is again as shown in Fig. 21. The slight rotation of the timer shaft 301 causes the pawl 307 (Fig. 22) to slip off the surface of the elongated tooth and engage the next tooth of the ratchet 306 whereupon the rocking of the lever 311 by the cam 314 will rotate the timer shaft 301 for one-sixth of a revolution on the pawl 307 engaging each tooth of the ratchet 306. At the end of six cycles or revolutions of the shaft 58 the pawl 307 will again engage the surface of the elongated tooth and as the starting pulse is not supplied at this time it will again ride back and forth on the surface of the tooth 316. The movement of the timer shaft is not an even rotational movement but a series of steps each of which carries the shaft rather quickly through a sixth of a revolution and allows it to remain stationary until the early part of the next machine cycle. The shaft is releasably held at the end of each step by an impositive lock consisting of a latch 335 which engages suitably spaced notches 334 in a disc 333 fixed to the timer shaft. The energization of the magnet 317 then has caused the timer shaft to move from its home position through a single revolution back to its home position during six cycles of machine operation. It may be stated however, that the six steps or cycles of timer operation need not coincide with the usual machine cycles as the point in the machine cycle in which timer operation is initiated may be chosen when most convenient.

The cams 302 are suitably shaped with respect to the particular timer in which they are assembled and the function which it is to perform to control the operating circuits of the machine. After the timer has run out its six cycles and has come to rest in its normal position timer contacts 304 and 305 are inoperative until the magnet 317 is again energized to institute another timer operation.

The construction and operation of the starting timers and the totaling timer are very similar but their effect is entirely different. The starting timers are merely to set the machine in operation regardless of the position of the record cards with respect to the analyzing brushes and to control the machine for a sufficient number of cycles to permit the necessary setups of the usual machine control system. The totaling timer selects certain cycles for printing without reset of the accumulator counters and other cycles for printing and restoring the accumulator. These different functions result merely from the shape of the cams and the arrangement of the controlling circuits which will be described in detail in connection with the general operation.

Switchbars and jacks

Many of the controlling circuits of tabulating machines are governed in their opening and closing by several different controlling devices, for example, the counter magnet circuit is sometimes controlled directly from the analyzing brushes as in tabulating and sometimes from the total timer as in total printing. The machine circuits are so numerous that it is desirable to use common return and feed conductors as much as possible to economize in the use of wire and to simplify the circuit diagram. These features are prone to cause short circuits or undesirable cross or back circuits interfering materially with the machine operation. These difficulties are overcome in the present case by providing automatically operating switchbars to cut off the different groups of controlling devices from their respective circuits whenever the machine operation does not require them to be actually connected. The switch bars have been explained generally in connection with the description of Fig. 1 of the drawing and a typical one of them is shown in detail in Figs. 17 and 18. A description of this will suffice for all as they are all substantially similar, the only difference residing in the form of their cams and the time of their operation. Referring now to Figs. 17 and 18 the switchbar is controlled by a jack comprising a casing 341 through which the shaft 62 driven by the gear train 56 (Fig. 1) extends. Fixed to the shaft 62, within the confines of the casing is a disc 342 provided with a notch 348. This disc, of course, turns constantly with shaft 62. Loosely mounted on the shaft 62 is a structure consisting of a disc 343, larger in diameter than the disc 342, and a cam 344. Discs 342 and 343 constitute a one revolution clutch substantially similar to those well known in the art. Pivoted on the disc 343 is a dog 345 having a projection 347 adapted to engage in the notch 348 and constantly urged to engaging position by a spring 346. This engagement is normally prevented by an arm 349 on the dog which extends into a notch 350 formed in a pivoted latch member 371 biased to latching position by a spring 374. The latch member 371 also carries the armature 372 of magnet 373. If the magnet 373 is energized instantaneously it will attract its armature and release the latch mechanism permitting the extension on the dog to engage in the notch 348, whereupon the disk 343 and cam 344 will rotate with disk 342 and shaft 62. These parts will only rotate a single revolution as when they return to their initial position the arm 349 reengages in the notch 350, the latch lever 371 now being released by the magnet, and the dog 345 will be rocked out of engagement with the disc 342. The cam 344 actuates a cam follower 375 rotatably supported between upwardly extending ears of a cylindrical member 376 adapted to reciprocate in a guide formed by an inwardly extending flange 377 of the casing 341. The member 376 with the cam follower is normally urged upwardly by a spring 378 surrounding a shank 379 integral with member 376. As the cam 344 rotates it depresses the member 376 through the cam follower 375 and the shank 379 forces the operating rod 381 of the switchbar downwardly. When the low portion of the cam is presented to the cam follower 375, member 376 and its shank will rise under the action of the spring 378. The operating rod 381 is connected at its lower end to a bell crank 383 whose opposite end is pivotally connected to the switchbar 382. A suitable spring (not shown in Figs. 17 and 18 but illustrated diagrammatically in connection with the switch bar in Fig. 1) tends to rock the bell crank 383 clockwise causing the rod 381 to follows the movement of the shanks 379. A plurality of bridging contacts 383 are mounted on this switchbar 382 and insulated from it and from each other. When the rod 381 is depressed these bridging contacts are forced into engagement with stationary contacts 384 and remain there until the rod 381 rises whereupon they will be returned to normal non-bridging position. The lower contacts 384 may be connected with the control circuits and the upper contacts may be connected to the control devices, thus providing for positively disconnecting the control devices from their circuits whenever their operation is not required.

Card feed clutch

The card feed clutch shown diagrammatically at 102 in Fig. 1 and detailed in Fig. 19 is of the usual type of one revolution clutch, well known in the art, but embodies some unusual structural features to adapt it to the operation of the present machine. The last gear wheel of the train 101 is freely supported on the card feed shaft 103 and has a notched disc 391 rigidly attached to it. The rotation of the gear wheel and disc does not ordinarily cause rotation of the card feed shaft. Fixed to this shaft is a disc 392 carrying a pivoted dog 393 overlying the disc 391 and having a nose portion 394 normally urged by a spring 395 into engagement with a notch 403 therein. The dog is prevented from engaging in the notch by a latch mechanism consisting of a pivoted latch lever 396 having an extension adapted to engage a lug 397 on the dog and hold it against the action of spring 395. This latch has a spring 398 attached to it tending to constantly rock it out of the path of the lug 397. This tendency is prevented by a second pivoted latching lever 399 having one arm engaging the top of lever 396 and holding it in latching position and another arm on which is supported the armature 400 of a magnet 402. A spring 401 biases the lever 399 to latching position. The disc 392 and shaft 103 are held in normal home position by the latch lever 396 and another latch 404 engaging a stop pin 405. The latch lever 396 also engages one arm of a bell crank 406 which through an insulating bail 407 closes two pairs of spring contacts M—1 and M—5 of which only M—1 is visible in Fig. 19. The contacts M—5 are located behind M—1 and are exactly similar to them, both pairs being opened and closed simultaneously. The clutch is operated by energization of the magnet 402 which attracts its armature 400 and rocks the latch 399 out of latching position. The spring 398 thereupon rocks latching lever 396, which releases the dog 393 and permits the nose portion 394 to engage in the notch 403. The disc 392 and shaft 103 then rotate with the disc 391 effecting card feed in the usual manner. Incidentally the rocking of latch lever 396 releases the bell crank 406 and permits the contacts M—1 and M—5 to open due to their own resiliency.

The card feed shaft continues to rotate as long as the magnet 402 is energized once every cycle to prevent relatching of the disc 392. If this magnet fails to energize at the proper point in any cycle the clutch will disengage at the end of the cycle when it reaches home position. The stop pin 405 once each revolution engages a cam arm 410 integral with the latch lever 396 and rocks the latter into latching position. This has no effect on the clutch as long as the magnet is energized at the proper time as the lever 399 is then rocked to release the latch 396 which is returned to unlatching position by its spring 398 before the dog reaches the position in which its lug 397 can engage the latch. If the magnet 402 is not energized at the proper point in the cycle the latch lever 396 remains in latching position and the lug thereon catches the projection 397 on dog 393 and releases it from the notch 403, thereby unclutching the discs and arresting card feed at the end of the cycle. It will be noted that this unclutching operation, no matter when it is initiated, can only become effective at the end of a cycle so that the card feed shaft always rotates for one or more complete revolutions. When the discs come to rest rebound is effectively prevented by the coaction of locking lever 404 with stop pin 405.

*Paper feed*

The paper feed for this tabulator must have special provision for controlling the feed during the controlling cycles instituted by the timers as otherwise the totals printed will become considerably displaced on the paper with respect to their group indicating number and the listed items and there will also be undesirable spacing between the printing for different card groups. A paper feed mechanism which will properly arrest the feed when necessary is shown in Fig. 24. The paper is fed from a suitable magazine roll (not shown) around the platen roll 421, and idler roll 422 pressing against the platen to maintain the paper firmly against it. The printing ribbon is fed from the magazine roll 423 to the storage roll 424, a suitable guide 425 being provided to lead the ribbon in proper relationship to the platen. The platen roll 421 and ribbon feed roll 424 are each provided with ratchet teeth 426 and 427, respectively, with which pawl rods or links 429 and 430 cooperate. These links are pivoted at their ends to one end of a rocking lever 431 whose other end is pressed by spring 434 against a cam 433 mounted on a shaft 432. The shaft 432 rotates in synchronism with the machine operation and as long as the lever 431 is unlatched it is oscillated once each cycle by the cam 433, thereby reciprocating the pawl links 429 and 430 which, through the ratchets 426 and 427, advance the paper and ribbon one step for each cycle. The feed is arrested during those cycles in which no printing occurs by a pivoted double arm latch lever 437 having a notch in one arm adapted to engage a lug 435 on lever 431 and hold the latter out of the path of the cam 433. The latch when so engaged prevents oscillation of the lever 431 and interrupts paper and ribbon feed. The latch 437 is urged into position from engaging the lug 435 by a spring 436 but the angle of contact between the lever and the lug and the relative strengths of the springs 434 and 436 are so proportioned that in the absence of additional locking action on the lever 437 the lug 435 can slip out from beneath the latch arm and permit the lever 431 to follow the cam 433. The additional locking action is provided by a pivoted member 438 supporting a magnet armature 439 on one arm and having its other arm releasably held in the path of the latch lever 437. The latter is thus held firmly in latching position as long as the parts remain in the position shown in Fig. 24. The latching mechanism is released to cause paper and ribbon feed when necessary by energizing magnet 440 which attracts its armature 439 and rocks the pivoted member 438 out of the path of the latch lever 437 whereupon the rocking lever 431 is free to follow the cam 433 to cause paper and ribbon feed. The magnet 440 is under control of the timers and other machine elements, as will appear later, to adjust the paper feed to the selected machine operation.

Panel board system

The present machine provides for universally interconnecting the control elements of the machine with the operating elements so that any one of a group of the former can be operatively connected to any one of a group of the latter. For example, any lower brush may be selectively connected to any adder element and to any printing magnet for listing and any accumulator unit may be connected to any printing magnet for controlling total printing. This selector feature permits greater economy in the use of accumulator units and printing units as the operation of either is independent of the other and if an adding element be used without printing the use of it does not reduce the printing capacity of the machine as the full bank of printers still remains available for use. This flexibility of operation is obtained by connecting each control element and each printing and accumulating element to individual sockets on a panel board whereby the desired interrelation may be obtained by properly plugging on the board.

The panel board is shown at 470 in Fig. 30A and on this board are mounted the usual automatic control magnets 474 and control contacts 475, whose operation is fully described in U. S. patent to Lake No. 1,600,413, issued September 21, 1926, and the several switchbars 77, 83, and 91 to 94, inclusive. The upper brushes or control brushes are connected to single sockets 472 and the lower brushes are connected to triple sockets 239. Any desired magnet 474 may be plugged in series between the upper and lower brushes so that the automatic control may be governed by any of the brushes and by any of the control contacts 475. The printing magnets 221 are permanently connected to triple sockets 243 on the panel board and also by wires 244 to plugs by which they may be connected to any of the zero and character printing devices 292. The sockets for these plugs are contained in the zero printing devices themselves as this has been found to be the most convenient arrangement for the present machine. It is obvious, however, that suitable sockets could be provided on the panel board permanently connected to the zero printing device, if desired. The counter magnets of the accumulator units 151, 251, 351, etc., are each connected to an individual triple socket 486. The transfer contacts of the adder units are connected to sockets 481 and 482 on the plug board and the total print contacts designated 245 for unit 1 are connected through the total printing switchbar 83 to sockets 479 on the panel board. The group indicating switchbar 94 is provided with terminal sockets 477 and 478 to permit it to be plugged to any of the lower brushes and printing magnets 221. The total switchbars 91, 92 and 93 have one group of contacts permanently connected to one side of the line through a suitable cam contact R2 (Fig. 30) and the cooperating group of contacts terminate in the sockets 485, 483 and 484 respectively on the plug board. This permits of substantially universal selection between the controlling units and the operating units.

Plugging arrangements have been represented on the drawing in which the wavy lines represent jumpers to indicate a possible machine setup requiring the operating of all the units. The upper and lower brushes to the extreme left have been selected for automatic control by plugging an auto control magnet 474 in series between them, the circuit extending from socket 472 through magnet 474 to socket 239. The first two lower brushes from the left have been plugged for group indicating, plugging in this case consisting of jumpers connecting the first and second sockets 239 on the left of the panel board through the switchbar 77 and the group indicating switchbar 94 to the printer magnet sockets 243. The third and fourth lower brushes from the left have been plugged to adder units 3 and 4 for adding and to the third and fourth printing magnets for listing, plugging in this case consisting of jumpers between the sockets 239 and the sockets 474A of the adding and listing switchbar and additional jumpers from the corresponding sockets 241 and 476 to the printing magnet sockets 243 and the counter magnet sockets 486 of these units respectively. The adding unit 3 has been plugged for totaling without reset by means of a jumper extending from the counter magnet socket 486 to a socket 484 of the total without reset switchbar 93. The unit 4 is plugged for totaling with reset, a jumper for this purpose being provided between the counter magnet contact 486 and socket 483 of the total and reset switchbar 92. The unit 5 is plugged as a carrier unit for transferring operations from unit 4 through a jumper between the socket 482 of unit 4 and counter magnet socket 486 of unit 5. This arrangement has been selected more or less with a view of avoiding complicated crossing of the jumpers and it should be understood that the symmetrical arrangement shown is not a limitation of the possibilities of plugging, and as it is entirely immaterial to machine operation which units are selected for control by any of the controlling devices.

General operation

The complete operation of the machine may be understood from Figs. 30 and 30A which should be placed side by side with Fig. 30A to the right to form a complete circuit diagram. The machine circuits are energized from power lines 490 and 491 between which driving motor 50 is directly connected through a switch 492. Closure of the switch 492 starts the motor, setting the machine into operation but there is no card feed as yet as the card feed clutch magnet 402 is deenergized and the clutch 102 disengaged. Card feed is started by depressing the starter key ST, closing contacts 502, which initiates the operation of either the D or E starter timer depending on the initial position of the cards with respect to the lower analyzing brushes. If there is no card under the lower brushes, the lower card lever 504 will be in the position shown in Fig. 30 closing contacts 505 and opening contacts 506. In this case the timer D will be selected, its starter coil 503 being energized through a circuit extending from line 490 through card feed contacts CF9, closed in the D position, contacts M—1, closed as long as the card feed clutch 102 is disengaged, then serially through timer contacts E7, D7 and F12 to start key contacts 502, thence through contacts 505, starter magnet 503 and wire 514 back to line 491. This starter circuit includes contacts on all the timers and contacts on the card feed clutch and card feed shaft in series. The contacts on the timers are closed when the timers are in normal rest position and broken as soon as the timer pawl starts in operation. The contact M—1, as will be recalled from the description of the card feed clutch, is closed as long as the clutch is disengaged and opened when the clutch engages. Once each cycle this contact is closed, however, owing to the rocking of the latching lever 396 by the stop pin 405 (Fig. 19). During this closed interval the card feed cam contact CF9 opens. The conjoint operation of contacts CF9 and M—1 then holds the starter circuits open as long as the card feed clutch is engaged. This series of contacts effectively prevents the energization of any starting timer starting coil while any other timer is in operation or while cards are being fed under the analyzing brushes.

The energization of starter coil 503 starts the D timer and it runs for six cycles. The contact D—2 closes in the first timer cycle and opens in the fifth thus conditioning a card feed clutch magnet circuit for three full cycles. This circuit is closed once each machine cycle by regular cam contact R1 and extends as follows: from line 490 through wires 507 and 508 to contacts D2, thence through wires 509 and 510 to regular cam contacts R1 closed at the proper point in each cycle, and through wire 511 and card clutch magnet 402 and wires 512 and 514 back to the other side of the line 491. The energization of card feed clutch magnet 402 causes engagement of the card feed clutch and the card feed shaft rotates during these three cycles of timer operation regardless of the condition of the automatic control circuit. The lower brushes are energized through a circuit extending from line 490 through cam contacts 519, lower brush lever contacts 520, card feed contacts CF10 and wire 521 to conducting block 522 on which the lower brushes are mounted. The lower brush lever contacts 520 are closed only when cards are under the lower brushes and during this time a pulse of energy will be supplied to the brushes for each index point position by the closre of the contacts 519 by their cooperating dentated cam, this cam being designed to close the circuit after a brush reaches a card perforation and open it before the brush clears it.

The first card feeds to the upper brushes during the second cycle of timer operation and to the lower brushes during the third cycle. The group designating number is printed from this first card. The timer contacts D1 close during the third cycle of timer operation and open during the fourth. The closure of these contacts energizes the group indicating switch bar magnet 515 during the third cycle through a circuit extending from line 490, wires 507 and 508 to contacts D1, thence through wire 516 to cam contact R4 and through switchbar coil 515 and wires 517 and 514 to the other side of the line 491. The energization of the magnet coil 515 causes the group indicating switch bar 94 to shift to circuit closing position for a single machine cycle during which the group indicating number is printed from the first card then under the lower brushes. The group indicating numbers are printed from the card columns cooperating with the two lower brushes to the extreme left and the circuit may be traced for one of them as follows: from line 490 through wire 518 to cam contacts 519, which are closed momentarily for each index point position on the cards, and lower card lever contacts 520 to card feed contacts CF10, thence through wire 521 to brush block 522 and through the extreme left hand brush to contact block 473, thence through upper wire 238 to socket 239 on the extreme left of the panel board 470. From this point the circuit extends down the left hand edge of the panel board through jumper 523 to and across a contact of the adding and listing switch bar, now closed, through jumper 524 to and across a contact of the group indicating switch bar 94 and through jumper 525 to socket 243 and thence through upper wire 244 to the printer magnet 221 on the extreme left. The group indicating printing circuit for the other indicating column is substantially similar to the one just traced. It is often required to print the group designating number opposite the total as well as opposite the first item of the group. For this purpose an accumulator is wired with the group indicating printing magnets so that the group indicating number is entered into the accumulator from the first card of the group when the designating number is printed from it. This accumulator is also plugged to the group designating printer magnets through the total with reset switchbar 93 so that when totals are taken the group designating number will be again printed under control of the accumulator and the accumulator cleared.

The paper feed is controlled during D timer operation by the contact D3. It will be recalled from the description of the paper feed device that the paper feed magnet 440 must be energized to release the paper to feed one space during a cycle. The D timer insures machine operation for six timer cycles but cards are being fed past the lower brushes during only the latter four of these cycles. The magnet 440 must be energized during these last four cycles to permit listing of each card if desired and must be deenergized during the first and second cycles to suppress paper feed. The paper feed magnet circuit extends in series through card feed cam contacts CF8, timer contacts D3 and cam contacts R14. The cam contacts CF8 and R14 are timed together so that if all three contacts are closed during the same cycle the magnet 440 will be energized but if any one of them is opened it will not be energized. The first cycle of timer operation merely prepares the card feed clutch magnet circuit and the card feed cam contacts CF8 do not close; consequently there is no paper feed in this cycle. During the second cycle the first card is fed to the upper brushes and although the card feed contacts CF8 close in unison with the cam contacts R14 during this cycle there will be no paper feed as the contacts D3 are open. During the third cycle the first card feeds under the lower brushes and this is the first cycle of operation in which printing and paper feed is desired. The contacts D3 now close and remain closed until the timer is again operated and the magnet 440 is energized during this and each subsequent cycle by the closure of contacts CF8 and R14 to space the paper after listing from each card. If the machine is not listing but merely tabulating paper feed may be interrupted, except when totals are being taken, by opening the switch 621 which opens the paper feed magnet control circuits from the D and E timers but permits operation of the control circuit from the F or total timer.

The D timer runs out at the end of the sixth cycle and comes to rest in its normal home position and the control of the machine is assumed by the automatic control circuit after the fourth cycle of timer operation. The left hand upper and lower brushes have been plugged through the control magnet 474 on the extreme left of the panel board and this magnet will be energized once each card cycle as long as the perforations in the cards under the upper and lower brushes agree. The control magnet when energized closes its contacts 475 which are locked closed until toward the end of the card cycle when they are opened. After the D timer contacts D—2 open, the circuit of the clutch magnet 402 is shifted to the automatic control contacts 475 and the energizing circuit then extends from line 490 through switch 526, which is placed on contact 527 for automatic control, through wire 528, auto control contacts 475 and wire 510 to cam contacts R1 and thence through wire 511 and magnet 402 to the other side of the line through the circuit previously traced. The card feed clutch magnet will thus be energized once each card cycle ensuring card feed as long as the card group does not change.

While the card group is feeding past the analyzing brushes items recorded on the cards may be entered into the accumulators and listed, accumulating units 3 and 4 being plugged for adding and the third and fourth printer magnets from the left being plugged to corresponding lower brushes for listing. The third or middle lower brush on encountering a card perforation closes a circuit extending through itself to middle contact block 473 and middle wire 238 to triple socket 239, thence through a jumper 528 to a socket of the adding and listing switch bar 77. The latter closes during each cycle in the absence of a totaling operation and continues the circuit through two branches, one extending through socket 241 and jumper 529 to the printing magnet socket 243 for listing, and the other extending from socket 476 through jumper 530 to counter magnet socket 486 for accumulating. Listing and accumulating will continue without interruption as long as the card group does not change.

Total printing may be automatically initiated at the end of a card group by closing the total switch 531. The first card of a new group arriving under the upper brushes fails to close the circuit of auto control magnet 474 during that cycle and the auto control contacts 475 remain open thereby preventing energization of the card feed clutch magnet 402. The card feed clutch disengages at the end of the cycle leaving the last card of the group just tabulated under the lower brushes and the first card of the next group under the upper brushes. The contacts M—5 close before the end of the cycle and shortly after this but still before the end of the cycle the card feed contacts CF6 close momentarily completing a circuit for the F timer starting coil 536. This circuit may be traced as follows: from line 490 through contacts CF6 and M—5, wire 537 to starting coil 536, thence through wires 512 and 514 back to the other side of the line 491. The F timer then starts and continues in operation for six cycles during which the several types of total printing of which the machine is capable may be carried out. The plugging arrangement indicated in the drawing provides for total printing without accumulator reset on unit 3 and for total printing with reset on unit 4. The F or total timer governs these operations in different cycles and will properly condition the control circuits for them regardless of whether any accumulator units are plugged for them or not.

The first cycle of total timer operation overlaps the last tabulating cycle and no actual printing operations occur during this cycle although the contacts F1, F2, F3 and F—11 close to prepare certain circuits for energization during subsequent cycles. The contact F—11, which closes during the first cycle, opens during the fifth and prepares a total printing circuit which extends from line 490 through wire 507 and contact F—11 to cam contacts R3. The cam contacts R3 close and open nine times during each machine cycle and their closures are synchronized with the accumulator elements so that each closure corresponds to a possible bridging of the total print contacts of the accumulators during totaling. These contacts cause a properly timed pulse of energy to flow through any total print circuit which is closed by an accumulator and prevent sparking at the accumulator total print contacts. The total print circuit extends from contacts R—3 through wire 542 to a total print contact of each accumulator unit, that of unit 1 being designated as 246. This circuit is extended through the proper control magnet under the control of the accumulator unit. The total print switch bar 83 closes during the second cycle of timer operation, the circuit of its jack magnet 339 being prepared during the first cycle by the closure of timer contacts F—2 and closed by the regular cam contacts R13 at the beginning of the second cycle. The contacts F—2 open during the second cycle and prevent operation of the switch bar during the third cycle. The circuit of the jack magnet 339 extends as follows: from line 490 through wire 507, contacts F—2, wire 541 to cam contacts R13, thence through jack magnet 339 and wires 517 and 514 back to line 491. The contact F—1 closes a break in the circuit of the jack magnet 537 of the total without reset switch bar 93 during the first cycle and opens the break during the second cycle. The circuit is closed by the regular cam contact R10 which closes at the beginning of each machine cycle. The jack magnet on being energized shifts the total without reset switch bar 93 to circuit closing position and this bar remains in this position during the entire active period of the machine cycle corresponding to the second timer cycle and then returns to open circuit position. All the accumulator units which are plugged for total printing without reset then energize their associated printing magnets during the second cycle of total timer operation. The circuit of jack magnet 537 may be traced as follows: from line 490 through wire 507 to contact F—1, thence through wire 538 to cam contacts R10 and through jack magnet 537 and common returns 517 and 514 back to line 491.

The accumulator unit 3 has been plugged as indicated in the drawing for total printing without reset. Its total printing is therefore done during the second timer cycle. At the beginning of each cycle of machine operation a pulse of energy is supplied to the upper contacts of each switch bar 91, 92 and 93 through a cam contact R2 connected to the contacts by a wire 543. The switch bar 93 being closed during the second cycle, a pulse of current will be sent through the counter magnet of accumulator unit 3, the circuit extending from a lower contact of bar 93 through a jumper 544 to socket 486 connected to the counter magnet of this unit. The clutch of the differential of unit 3 thereupon engages and when the counter element passes zero its total contacts are bridged completing the total printing circuit previously traced to the total print contacts from these contacts through contacts of the total print bar 83 and jumper 545 to socket 243 of the proper printing magnet. The counter element in this case, of course, regains its initial position and holds the total.

Total printing with reset of the accumulator units is effective in the machine cycle corresponding to the fourth cycle of F timer operation, the necessary circuits being prepared during the third timer cycle during which, however, no actual printing operations occur. In the diagram accumulator unit 4 is plugged for total and reset operation. During the third timer cycle the contact F—2 again closes opening in the fourth, and at the beginning of the latter cycle the closure of the regular cam contact R—13 again energizes the jack magnet 339 of the total printing bar 83 to permit this bar to move to closed circuit position during the fourth cycle. The contact F—7 closes in the third timer cycle and opens in the fourth permitting the cam contact R—11 to energize the jack magnet 548 of the total and reset bar 92 at the beginning of the fourth cycle. The energizing circuit for the jack magnet 548 may be traced as follows: from line 490 through wire 507, contacts F—7, wires 546 and 547 to cam contacts R—11 thence through jack magnet 548 and common returns 517 and 514 to the side of the line 491. The counter magnet of accumulator unit 4 gets its operating pulse at the proper point in the fourth cycle through a circuit extending through the jumper connection 540, the circuit being substantially similar to that traced above for the counter magnet of unit 3.

The counter element of unit 4 in this case must be arrested in zero position and the total printing control rock bar 147 must be rocked to the position shown in Fig. 10 during the total and reset cycle. This is accomplished by energizing the reset magnet 283 shown in Fig. 3. This magnet is controlled by cam contact R15 (Fig. 30) in conjunction with the timer contact F8. The latter closes during the third cycle of timer operation and opens during the fourth and during the latter cycle the closure of the contact R15 energizes the reset magnet through the following circuit: from line 490 through wire 507, contact F—8 to cam contacts R15 thence through reset magnet 283 and common return 514 to the other side of the line 491. The printing control bar 147 is thereupon rocked during the fourth cycle to the position shown in Fig. 10 causing the adder element of all units which are plugged for totaling with reset to be arrested in their zero or home position. At the end of the fourth cycle the printing control bar rocks back to normal tabulating position through the action of its cooperating cam 290 Fig. 3. All the total printing operations are concluded at the end of this fourth cycle and the fifth cycle of timer operation is utilized to restore the timer contacts to their normal positions and to initiate the operation of the starter timer E if automatic resumption of tabulating is desired.

The paper feed during total printing must be taken care of by the F timer itself as there is no card feed at this time and the card feed contacts CF8 which normally control the spacing of the paper are open. The paper feed magnet 440 is controlled during total printing by the F timer contacts F3 which close during the first cycle and open during the fifth permitting the cam contacts R14 to energize the magnet during the second, third and fourth cycles of timer operation. This provides for suitable paper feed during the total operations.

Tabulating will be automatically resumed on the next card group if the switch 555 is closed. In this case the E timer starting coil 317 will be energized during the fifth cycle of F timer operation by a circuit extending as follows: from line 490 through wires 507, to contacts F9 closed in the fourth cycle and opened in the fifth, thence through switch 555, cam contacts R5, closed instantaneously during each cycle of machine operation, and thence through wire 556, lower card lever contacts 629, starting coil 317 and wires 557 and 514 back to the other side of the line 491. The energization of the starter coil 317 initiates operation of the E starter which as in the case of the others runs for six cycles. The E timer is very similar in its operation to the D timer save that its contacts are timed to control starting under slightly different conditions. A total has just been taken of the items of the previous group and the last card of this group is under the lower brushes while the first card of the next group is under the upper brushes. During the first cycle of operation of the E timer the contact E2 closes and opens in the second preparing a circuit for clutch magnet 402 which is energized at the beginning of the second cycle by the cam contact R1. Cards immediately start feeding, the first card of the new group passing under the lower brushes during this cycle. Tabulating is then resumed substantially as described above, automatic control in this case being assumed by the automatic control circuit after the second cycle of timer operation. The contact E1 likewise closes during the first cycle and opens during the second to permit the cam contact R4 to energize the group indicating switch bar jack magnet 515 during the second cycle so that the group indicating number may be printed from the first card of the group. The contact E3 which closes in the first timer cycle and opens during the second controls the paper feed. In this case the paper should be spaced to advance it beyond the line of the total just printed. This is effected just before card feed starts during the second cycle of timer operation by the contact E—3 whose closure permits the cam contact R14 to energize the paper feed magnet 440 at the beginning of the second cycle. It will be noted that the E timer relinquishes control of the machine to the automatic control circuit at the end of the second cycle, and while the timer mechanism runs for four more cycles it has no controlling effect on the machine during these cycles.

The end of the last card group presents slightly different operating conditions from those prevailing at the end of the other groups in that as the last card of this group is passing the lower brushes there is no card under the upper brushes. This permits every upper brush to engage its contact block 471 and the circuit of any auto control magnet 475 which happens to be plugged will be maintained during this cycle. The automatic control circuit will therefore maintain the machine in operation to feed the last card past the lower brushes. After it has passed the lower brushes the lower card lever contacts 520 open thereby removing power from the lower brush contact block 522 interrupting the auto control magnet circuits and preventing closure of the auto control contacts 475 whereupon the clutch magnet 402 is deenergized releasing the card feed clutch and permitting contacts M—5 to close establishing starting circuit with the F timer which operates to take and print totals as explained above. At the end of the total timer operation in this case it is not desired to automatically initiate operation of the E timer and to prevent this lower card lever contacts 629 are inserted in the wire 556 connecting the E timer starting coil 317 to the F timer contacts F—9. In the absence of a card under the lower brushes these contacts will be opened and hence prevent automatic starting of the E timer after the last card group.

The grand totals of the subtotals which have been accumulated on those accumulators which are plugged for total without reset operations may be taken by closing the grand total reset switch 558 which places the grand total jack magnet 559 in parallel with the total and reset magnet 548 and then depressing the start key ST. The closure of the start key contacts 502 energizes the D timer starter coil 503 and sets this timer in operation which upon closure of its contacts D—2 energizes the card feed clutch magnet 402 through the circuit previously traced. There are no cards in the magazine to be fed at this time but the card feed clutch will engage, rotating the card feed shaft and operating the card feed cam contacts. The opening of the timer contacts D—2 will eventually prevent energization of the card feed clutch magnet at the proper time in the cycle permitting the contacts M—5 to remain closed and during this cycle the closure of the card feed cam contacts CF6 will cause energization of the total timer starting coil 536 through the circuit previously traced. The F timer then starts operation and in the total and reset cycle of its operation will cause the grand total switch bar 91 as well as the total and reset switch bar 92 to move to circuit closing position, the controlling coils of these two now being in parallel through the closure of the grand total reset switch 558. The total print selective rock shaft 147 is in the position shown in Fig. 14 during this cycle and all accumulator units which are plugged either for total with reset or grand totaling will print the amounts standing on their counter elements and have their counter elements arrested in zero position. Ordinarily all accumulator units of the machine which are plugged for total without reset operation should also be plugged for grand totaling so that the machine will be completely cleared after the grand totaling operation. This is not essential, however, as grand totals may be retained on certain units indefinitely, if desired.

This grand totaling operation should be performed with all units properly plugged prior to inserting cards in the magazine for tabulating and listing in order to clear the machine of any data which might be standing on its counter elements from a previous operation.

The grand total switch 558 may be closed during the feeding of the last card group in which case the grand totals will be taken during the same group of cycles of the total timer in which the subtotals are taken. In this case the units which are plugged for sub-totaling without reset and grand totaling will print their sub-totals and grand totals during the same group of cycles of total timer operation but there will be no interference between the printing of these two totals as the sub-total without reset is taken during the second cycle of timer operation and the grand total with reset is taken during the fourth cycle.

The machine may be adapted to "stop" card or last card operation by moving the switch blade 526 to the contact 565 thus cutting the auto control circuit out of operation and extending the card feed clutch magnet circuit through the lower brush lever contacts 566. The machine may then be started as before and the cards will continue to feed until they have all been fed from the magazine or until the contacts 566 are opened on a stop card feeding under the lower brushes. The total timer F will be started in operation in this case also by the closure of the contacts M—5 on disengagement of the card feed clutch and totals will be taken of the group.

It may be desirable to interrupt the operation of the machine before the cards are completely exhausted from the magazine. When the machine is operating under group control this may be done by opening either the total switch 531 or the automatic start switch 555. Opening of either will cause the machine to cease operating at the end of the card group which is then passing the brushes. If the switch 531 is opened the machine operation will cease before the total of the group is taken and if the switch 555 is opened the machine operation will cease after the total of the group is taken. When the machine is under last card operation, that is, when switch blade 526 is on contact 565 it may be desirable to interrupt the machine operation before the cards are exhausted from the magazine and means are provided for interrupting the machine operation under these conditions at any time during the run. A double pole switch 635 has one of its blades inserted in the line 510 for interrupting the circuit of the card feed clutch magnet and its other blade in series with the total switch 534 for interrupting the circuit of the total timer starting coil 536. Opening of this switch will interrupt card feed and prevent operation of the total timer. Reclosing of this switch will permit the resumption of card feed by depressing the start key ST.

The invention has now been disclosed with reference to a single specific embodiment and the complete operation of the machine explained. It will be understood, however, that many modifications of the structural and electrical details will readily occur to those skilled in the art and I intend to be limited only as indicated by the scope of the following claims.

What is claimed is:

1. An accounting machine including a printing device comprising electrically operated control means, an accumulating device comprising a differential mechanism and electrically operated control means, separate control circuits for each of said control means and initiating means for listing operations comprising a common actuator for said circuits, an additional control circuit for said printing control means for totaling operations and an actuator for said last named circuit operated by said differential mechanism whereby items may be listed and their totals printed on a common record sheet by said printing device.

2. An accounting machine including a plurality of printing devices each comprising electrically operated control means, a plurality of accumulating devices each comprising a differential mechanism and electrically operated control means, a plurality of control elements each comprising a circuit actuator and detachable connections for connecting any of said printer control means and any of said accumulator control means to any of said actuators for conjoint operation in listing, an additional control element comprising a circuit actuator associated with each of said differential mechanisms for governing operation of a printer control in totaling and detachable means for operatively connecting any of said last named actuators to any of said printing control devices whereby items may be listed and their totals printed on a common record sheet by the selected printing devices.

3. An accounting machine including a recording device, an accumulating device comprising a counter element movable in the same direction for entering and restoring, control means associated with said accumulating device for causing actuation of said recording device when said counter element reaches home position and means for selectively arresting said counter element either in home position or after it has passed home position and regained its initial position.

4. An accounting machine including a recording device, an accumulating device comprising a counter element, movable in the same direction for entering and restoring, control means associated with said accumulating device for causing actuation of said recording device when said counter element passes home position and means for arresting said counter element after it has passed home position and regained its initial position.

5. An accounting machine including a recording device, an accumulator device comprising a counter element, means for operating said accumulator device to move its counter element through a complete cycle and recording control means associated with said accumulator device to effect operation of said recording device during said cycle while said counter element is in motion.

6. An accounting machine including a recording device comprising electrically operated controlling means, an accumulator device comprising a counter element, a control circuit for said controlling means, means for operating said accumulator to cause its counter element to undergo a complete cycle of operation and a circuit actuator associated with said control circuit and operated by said accumulator while its counter element is in motion during the cycle to effect recording.

7. An accounting machine including a recording device comprising electrically operated controlling means and a control circuit therefor, an accumulating device comprising a counter element, means for operating said accumulator device causing its counter element to undergo a complete cycle of operation and return to its initial position and a circuit actuator for controlling said circuit operated by said accumulator as its counter element passes through home position.

8. An accounting machine including a recording device, an accumulating device comprising a counter element, means operable after an item has been entered into said accumulating device for selectively moving said counter to home position to clear the accumulator or moving said counter through a complete cycle to restore the original item and means for operating said recording device to record the original item on either operation.

9. An accounting machine including a recording device, an accumulating device comprising a counter element, means operable after an item has been entered into said accumulating device for selectively moving the counter element to home position or moving it through a complete cycle to restore the original item and means for operating said recording device to record the original item as the counter element reaches home position on either operation.

10. An accounting machine including a recording device, an accumulator device comprising a counter element movable in the same direction for entering and restoring, means operable after an item has been entered into said accumulator for moving said counter element, means for selectively arresting the movement of said element in home position or after a complete cycle of operation and means controlled by said accumulator for operating said recording device to record the item originally standing in said unit as the counter element reaches or passes through home position respectively.

11. An accounting machine comprising a plurality of accumulator elements, one for each denominational order and a plurality of recording devices associated therewith and controlled thereby, resetting means for said elements with means for operating the same upon a recording operation and means for selectively associating the elements individually therewith whereby recording and resetting may be effected on any desired elements and recording without resetting effected on the other elements.

12. An accounting machine which is provided with a plurality of accumulator units having associated recording devices controlled thereby and forming an accumulating and recording bank, adapted to be split at any point to isolate desired accumulator units with their associated recording devices into independent sub-banks, characterized by the provision of resetting means for said units operable upon a recording operation and means for selectively associating any of such formed sub-banks therewith to effect resetting of the units of any sub-bank so selected without resetting of the units in the other sub-banks on a recording operation.

13. An accounting machine which includes a plurality of normally disconnected accumulating units any of which may be selectively interconnected to form one or a plurality of independent accumulating banks, characterized by the provision of means for clearing said banks and thereafter automatically re-entering the original items therein and selective means for disconnecting any desired banks from said last named means at the end of the clearing operation to prevent reentry of the original items therein.

14. An accounting machine which includes a plurality of normally disconnected accumulator units with associated recorders controlled thereby and adapted to be selectively interconnected to form one or a plurality of independent accumulating and recording banks, characterized by the provision of resetting means operable upon a recording operation and means for selectively associating any of such formed banks therewith to effect resetting of the units therein on a recording operation and permit recording on the other banks without resetting of their units.

15. An accounting machine including a plurality of printing devices, a plurality of corresponding accumulating devices each comprising a counter element, selective means for moving said elements to home position to clear or through a complete cycle of operation to reenter the original items, means controlled by said accumulating devices for effecting operation of said printing devices to print the original items when said counter elements reach home position and means cooperating with said first named selective means for selectively causing some of said accumulator devices to clear and others to retain the original items after printing.

16. An accounting machine including a plurality of printing devices each comprising electrically operated controlling means, a plurality of corresponding accumulating devices each comprising a counter element and a circuit actuator operable on said counter member reaching home position, a control circuit connecting each of said actuators to its corresponding printing controlling means, means operable after items have been entered in said accumulators to selectively move said counter elements to home position to clear or through a complete cycle of operation to reenter the original items thereon and selective means for controlling said last named means to cause desired accumulating units to clear and others to reenter the original items.

17. An accounting machine including a plurality of printing devices, a plurality of corresponding accumulating devices each comprising a counter element, means for selectively moving said elements to home position to clear or through a complete cycle to reenter the original items, means controlled by said accumulating devices for effecting operation of said printing devices to print the original items standing on said accumulating devices when said counter elements reach home position and selective means for disabling at will any of said last named means.

18. A cyclically operable accounting machine including a plurality of printing devices, a plurality of accumulating devices and means operated by the latter for controlling the former, means for selectively clearing said accumulating devices or retaining the printed data therein on a printing operation and controlling means for said selective means operable in one group of machine cycles to effect printing and clearing and in another group of machine cycles to effect printing without clearing.

19. A cyclically operable accounting machine including a plurality of printing devices, a plurality of accumulating devices and means operated by the latter for controlling the former, means for selectively clearing said accumulating devices or retaining the printed data therein on a printing control operation and controlling means for said selective means to automatically render it operative for one type of operation subsequent to an operation of the other type.

20. A cyclically operable accounting machine including a plurality of printing devices, a plurality of accumulating devices and means operated by the latter for controlling the former, means for selectively clearing said accumulating devices or retaining the printed data therein on a printing control operation, controlling means for said selective means to automatically render it operative for one type of operation subsequent to an operation of the other type and automatic controlling means for said machine to maintain it in operation for a number of cycles on instituting a printing operation to permit both types of operation in different machine cycles.

21. A cyclically operable accounting machine including a plurality of accumulating devices and a plurality of printing devices controlled thereby, means for selectively clearing said accumulating devices or retaining the printed data therein on a printing operation, controlling means for said selective means to automatically render it operative for its different types of operation in different machine cycles and means for automatically disabling selected accumulating devices in machine cycles pertaining to one type of operation and rendering them operative in machine cycles pertaining to the other type.

22. A cylically operable accounting machine including a plurality of accumulating devices and a plurality of printing devices controlled thereby, means for selectively clearing said accumulating devices or retaining the printed data therein on a printing operation, controlling means for said first named means to automatically render it operative for its different types of operation in different machine cycles, means for automatically connecting said accumulating devices to said first named means in machine cycles pertaining to each type of operation and disconnecting them therefrom in machine cycles pertaining to the other type and selective means for connecting each accumulating device to said last named means for either type of operation.

23. A cyclically operable accounting machine including accumulating devices and printing devices, and having accumulating and totaling functions, means for automatically controlling the operation of the machine for a group of cycles fixed in number and sequence after a change in its mode of operation and means responsive to the mode of operation for automatically controlling the operation at the end of the group of cycles.

24. In an accounting machine having accumulating and totaling functions, means operative in one machine cycle for automatically determining its operation in the next and means operative on initiation of either type of operation of the machine for automatically controlling it through a plurality of cycles.

25. A record controlled accounting machine comprising record analyzing means and means responsive to a record in cooperative relationship to said analyzing means for automatically controlling machine operation, an additional controlling means for automatically controlling a group of initial successive machine cycles independently of the record position suited to operation instituted with no record in cooperative relationship with the analyzing means and a similar additional controlling means suited to operation instituted with a record in cooperative relationship with the analyzing means and means responsive to initial record position for selecting one of said additional controlling means.

26. A record controlled accounting machine comprising record analyzing means accounting mechanism controlled thereby and an automatic control system responsive to records in cooperative relationship with said analyzing means for maintaining said machine in condition for accounting operation and additional automatic control means for maintaining it in operation for a plurality of successive machine cycles on initiation of operation said means comprising separate mechanisms for starting with and without a record in cooperative relationship with the analyzing means and means responsive to the position of the records for automatically selecting said mechanisms for operation.

27. An accounting machine which includes a plurality of accumulator elements and associated printing devices individual to denominational orders and adapted for association together in any desired combination of elements to form an accumulating bank characterized by the provision of means operable upon a printing operation for resetting the elements of such a formed bank and thereafter reentering the original item thereon.

28. An accounting machine which includes a plurality of accumulator elements and associated printing devices individual to denominational orders adapted for selective association together in any desired combinations of elements to form an accumulating bank, characterized by the provision of means controlled upon resetting of each element to operate its associated printing device and means for selectively reentering the original item in said bank after a resetting operation to permit printing with clearing or printing without clearing in connection with such a formed bank.

29. An accounting machine including printing control elements and accumulator elements, total with reset mechanism and total without reset mechanism operable on a total printing operation and means for selectively associating any printing control element with any accumulator element and means for selectively associating any accumulator with the total without reset mechanism or the total with reset mechanism.

30. An accounting machine including printing control elements and accumulator elements individual to denominational orders, total with reset mechanism and total without reset mechanism operable on a total taking operation and means for selectively associating any printing control element with any accumulator element and means for selectively connecting any denominational order accumulator element with either the total without reset mechanism or the total with reset mechanism.

31. An accounting machine including accumulating devices with rotatable counter elements adapted to receive and accumulate items, transfer mechanism for transferring from lower to higher elements, recording mechanism including means for rotating said counter elements through a complete cycle of operation, means operative while the counter elements are in motion for operating the recording mechanism to record the data originally standing on the elements and means for automatically disabling the transfer mechanism during the recording operation.

32. An accounting machine including accumulating devices with rotatable counter elements adapted to receive and accumulate items, transfer mechanism for transferring from lower to higher elements, recording mechanism including means for rotating said counter elements through a complete cycle of operation, means operative when the rotatable elements pass through zero position for effecting operation of said recording mechanism to record the data originally standing on the elements and means for automatically disabling the transfer mechanism during the recording operation.

33. An accounting machine including accumulating mechanism with rotatable denominational order registering elements and recording devices controlled thereby, rotatable actuators for said registering elements and axially shiftable clutches for engaging the registering elements with the actuators for a complete cycle of operation in the same direction in which they move in receiving entries and means operated by the registering elements on passing through home position for controlling the recording devices to effect recording of the data standing on the registering elements.

34. An accounting machine including accumulating mechanism with rotatable denominational order registering elements and recording devices controlled thereby, rotatable actuators for said registering elements and axially shiftable clutches for engaging the registering elements with the actuators to effect movement of the same in the direction they move in receiving entries, means for selectively shifting said clutches to disengage said elements when the registering elements reach normal home position or when they complete a cycle of operation and means operated by said elements on reaching home position for controlling the recording devices to effect recording of the data on the registering elements.

35. An accounting machine including a plurality of denominational order accumulator elements with the transfer devices therebetween, recording mechanism, rotatable actuators for driving said elements in one direction only and axially shiftable clutches for engaging the elements with the actuators for entering operations and for controlling the recording mechanism, means for operating said clutches to engage the elements with their actuators for a complete cycle of operation to control the recording mechanism, means to render the transfer devices ineffective during such an operation and means operated by the registering elements on passing through home position to control the recording mechanism to effect the recording of the data standing on the accumulator elements prior to the initiation of such operation.

36. An accounting machine including a plurality of denominational order accumulator elements with transfer devices therebetween, recording mechanism, rotatable actuators for driving said elements in one direction only and axially shiftable clutches for engaging the elements with the actuators for entering operations and for controlling the recording mechanism, means for operating said clutches to engage the elements with their actuators for such a controlling operation, selective means for disengaging the clutches when the elements reach home position or after a complete cycle of operation, means for rendering the transfer devices ineffective during such a controlling operation and means operated by the accumulator elements on reaching home position for controlling the recording mechanism to effect recording of the data standing on the accumulator elements prior to the initiation of such recording control operation.

37. An accounting machine including denominational order accumulator elements with transfer devices therebetween driving mechanism for said elements for driving the same in one direction only, an electromagnet for each element to control its drive from the driving mechanism and an individual line connected to each magnet, means for individually energizing said lines at differential times to enter data into said accumulator elements, recording mechanism and means for concurrently energizing said lines to initiate a complete cycle of operation of the elements to control the recording mechanism, means for rendering said transfer devices ineffective during said controlling operation and means operated by the individual elements on passing through home position to control said recording mechanism to effect recording of the data standing on said elements at the beginning of said complete cycle of operation.

38. An accounting machine including denominational order accumulator elements with transfer devices therebetween, driving mechanism for said elements for driving the same in one direction only, an electromagnet for each element to control its drive from the driving mechanism and an individual line connected to each magnet, means for individually energizing said lines at differential times to enter data into said accumulator elements, recording mechanism and means for concurrently energizing said lines to initiate a controlling operation of said recording mechanism by said elements, selective means for interrupting the drive of said elements individually as they reach home position or concurrently on regaining their initial position on such a controlling operation, means for rendering the transfer devices ineffective during such a controlling operation and means operated by the elements on reaching home position for controlling said recording mechanism to effect recording of the data standing on the element prior to said controlling operation.

In testimony whereof I hereto affix my signature.

FRED M. CARROLL.